United States Patent [19]

Seale

[11] 4,441,872
[45] Apr. 10, 1984

[54] FLUID ENERGY CONVERSION SYSTEM

[76] Inventor: Joseph B. Seale, 31 Avalon Dr., East Falmouth, Mass. 02536

[21] Appl. No.: 258,751

[22] Filed: Apr. 29, 1981

Related U.S. Application Data

[63] Continuation-in-part of Ser. No. 254,084, Apr. 14, 1981, abandoned.

[51] Int. Cl.³ .................................. 290 44; F03D 9/00
[52] U.S. Cl. .................................. 417/282; 62/228.3; 62/230
[58] Field of Search ..................... 62/133, 230, 228 C, 62/228 D, 323.4, 236; 122/26; 290/44; 418/282, 293, 307, 440

[56] References Cited

U.S. PATENT DOCUMENTS

| | | | |
|---|---|---|---|
| 3,653,783 | 4/1972 | Sauder | 417/298 |
| 3,664,148 | 5/1972 | Yonezu | 62/133 |
| 3,844,686 | 10/1974 | Le Blanc | 417/298 |
| 4,015,962 | 4/1977 | Tompkins | 62/236 X |
| 4,103,506 | 8/1978 | Adalbert et al. | 62/228 C |
| 4,336,001 | 6/1982 | Andrew et al. | 417/282 X |

OTHER PUBLICATIONS

Wind-Driven Refrigeration Project, Robert Franklin 1979.
Wind Energy Development Program, Auroville Jean Pougault et al., 6/82.

Primary Examiner—William E. Wayner
Attorney, Agent, or Firm—David A. Rich

[57] ABSTRACT

A fluid-driven pump directly converts fluid kinetic energy into displacement of a second fluid against a pressure differential. In one form of the invention, a wind turbine is coupled via a rotary shaft crank to a reciprocating piston in a large-displacement, double-acting compressor cylinder. In a preferred mode, a refrigerant gas is compressed to accomplish heat pumping and refrigeration. Timed compression-relief valving controls the time that the wind turbine is coupled to the fluid load to maintain maximum power transfer within useful operating limits of source and load. An electronic control circuit senses selected parameters to compute the desired duty cycle and provide an energizing signal to a pair of solenoid relief valves such that the optimum duty cycle is selected for maximum power transfer.

15 Claims, 12 Drawing Figures

FLOWCHART, PART I

FLUID ENERGY CONVERSION SYSTEM

This application is a continuation in part of my prior pending application filed Apr. 14, 1981, entitled Fluid Energy Conversion System, Ser. No. 254,084, now abandoned.

BACKGROUND OF THE INVENTION

1. Field of the Invention

The present invention pertains to fluid energy conversion systems and, more particularly, to energy conversion systems having variable, load-matching transformers for maximizing energy supplied to a load by a fluid energy source or conversion device, such as a wind turbine or a water turbine, where the fluid energy source and/or load vary with time.

2. Discussion of the Prior Art

Wind and water turbines operate at optimum efficiency only at a specific shaft torque which changes with variations in the fluid energy source. Optimum turbine rotation speed, determined by load torque and by the fluid energy source, will also vary with time. Turbine shaft torque will reflect variations in the energy-receiving load, e.g., changing voltage and/or frequency, changing water head, or changing gas pressures. To maximize energy or power transfer under changing source and load conditions normally requires a continuously-varying transformer which causes the torque reflected from the load to the turbine shaft to equal the instantaneous optimum torque for the fluid energy source.

There is much literature concerning torque-matching of a turbine to a variable fluid energy source. The energy-receiving load is often regulated to be substantially constant with time, e.g. utility lines or near-constant voltage batteries. Consequently, little attention has been given to matching variable loads; however, the following examples show that load variation with time is significant for several important wind-power applications.

First, in a wind-driven water pump used to fill a reservoir, hydraulic head, the pump's load, varies with water height in the storage reservoir and with water table depth, a function of rainfall and pumping-dependent drawdown. Hydrostatic head variation in a shallow-well with a highly rainfall-dependent water table, or a storage reservoir with considerable fill depth, is as great as two-to-one, or greater.

Second, in a compressed air energy system with storage tanks, tank pressure will vary over time as stored energy fluctuates. Back-torque from a fixed-geometry, positive-displacement compressor will vary little with changing compressor shaft speed but will vary significantly with changing reservoir pressure.

Third, in a refrigerant gas compressor driven by a wind or water turbine to pump heat from a varying ambient-temperature source into a variable-temperature heat reservoir, refrigerant gas pressures are determined by temperatures and temperature-dependent vapor-pressures in the evaporator and condenser, and pressures will commonly vary by a factor of two or more on both sides of the compressor, causing torque of a fixed-geometry compressor to vary by a factor of four under usual operating conditions.

The above examples present difficulties in efficiently matching variations in the fluid energy source, even if the load is presumed constant. Considering a wind turbine, the most economical wind turbines operate efficiently at high tipspeed ratios, i.e., high ratios of turbine-tip tangential velocity relative to windspeed upstream of the turbine's disturbing influence. Such high-speed turbines depend on high tangential velocity of the blades to develop large aerodynamic forces resulting in torque. In a given wind, turbine starting torque may be only 20% as great as torque at optimum-power speed, or starting torque may be zero. A high tipspeed-ratio turbine may be unable to start a positive-displacement pump or compressor under load, even under the load torque that would be optimum for energy transfer if the turbine were started and operating. For starting, some device must intervene in the power transmission path, such as a clutch, a variable-ratio rotary transmission, or a compression relief valve.

Once spinning, the turbine should operate at a constant tipspeed ratio to maintain a constant advance angle of the turbine blade tip and, thus, maintain all parts of the turbine blades at their most efficient angles relative to the fluid flow. For constant tipspeed ratio, rotation speed varies linearly with wind-speed. Since dynamic pressures (or Bernoulli pressures) vary as the square of windspeed, torque will vary as the square of both rotation speed and windspeed at constant tipspeed ratio. Power, the product of torque and rotation speed, will consequently vary as the cube or rotation speed and windspeed under optimum loading conditions. Accordingly, there is a great need for variable load-matching power or energy transformers for use with wind or water powered turbines. As a guideline to the needed range of variability, cube-law wind energy becomes negligibly small below roughly eight MPH. For most sites, windspeeds in excess of eighteen MPH are quite infrequent, such that the cost of designing a Wind Energy Conversion System (WECS) to operate at top efficiency for some windspeed above eighteen MPH is seldom economically justified in terms of average energy payback. A WECS that operates in a twelve MPH average wind regime, that begins power conversion at eight MPH, that is optimally efficient from eight to eighteen MPH, and that governs at constant power for winds exceeding eighteen MPH, will recover about 66% as much energy as a similar hypothetical (but impractical) system with optimum efficiency in all wind-speeds. 30% of the remaining energy represents high-end governing loss and only 4% represents the remaining low-end energy loss. Recovery of the lost 34% is usually not economically worthwhile because of design costs. The variation from eight to eighteen MPH is a speed ratio of 2.25, representing a square-law torque ratio of roughly 5 and a cube-law power ratio of roughly 11. Wind systems designed for higher or lower average wind regimes will generally require about the same ratio of torque and power variation for full turbine/load compensation.

The matching problem for a water turbine is similar to the wind turbine case. When hydrostatic head is converted to velocity of a water jet hitting a turbine, velocity varies as the square-root of head pressure. Optimum turbine torque varies as the square of both rotation velocity and water velocity, therefore linearly with hydrostatic head. Because of blade strength and cavitation limitations, water turbines do not operate at high tipspeed ratios. Consequently, starting torque of water turbines is relatively high, unlike many wind turbine situations. Besides operating with variable head, many water turbines use a variable-width nozzle to regulate flow to the turbine according to energy demand and water supply variations. Optimum turbine torque with a variable nozzle should vary as the product of nozzle orifice area times hydrostatic head or, equivalently, as the product of orifice area times velocity squared. Optimum turbine speed and tipspeed ratio is barely affected by nozzle orifice size. Power varies as orifice area times velocity cubed, or as orifice area times head to the 1.5 power.

Water turbines are excellent candidates for water pumping (to provide needed head for irrigation, municipal water supply, etc.), gas compression, and especially refrigerant compression for heat pumping, air-conditioning and refrigeration. The water used to drive the turbine is an excellent source and sink for thermal energy.

Most wind electric generators operate without specific turbine-to-load matching compensation. Average load mismatch losses for battery-chargine and resistance heater loads are less than 5%, provided the system is optimized for average load match. With constant-speed alternators and near-constant-speed induction generators operating into fixed-frequency utility grids, the best compromise constant turbine speed represents a 5% to 10% loss of recoverable power. A variable-displacement hydraulic transmission has been used to permit a range of constant-tipspeed-ratio turbine operation while the synchronous alternator operates at constant RPM. Most large alternator systems adjust field current with power lever to optimize power factor and minimize losses as power varies. It appears that little or no work has been done with time-varying electrical loads except for using battery storage which absorps the variations and presents a wind generator with a relatively fixed voltage.

Adaptive load matching to lift water or compress gases (including for refrigeration) is much more critical. A high torque, low-tipspeed-ratio multibladed turbine driving a single-acting piston water pump with buoyant shaft (to avoid even worse starting load) will recover less than 30% of potentially available wind energy (not including losses when the turbine furls or turns out of the wind in high winds). Double-acting pumps and multicylinder compressors spread the load more evenly through the rotation and can recover, ungoverned, about 45% to 60% of recoverable power, although the figure drops drastically if a cheaper high-speed turbine is used. Turbines with automatic clutches can perform reasonably well, recovering up to 65% of available power before accounting for governing, which lowers the figure.

Thus, it will be appreciated that there exists a great need for energy conversion systems capable of maximizing energy transfer from a fluid energy source, such as a wind or water turbine, to a load, and prior art attempts to maximize such energy transfer have not been effective even with the great amount of effort directed thereto.

SUMMARY OF THE INVENTION

Accordingly, it is a primary object of the present invention to overcome the above-mentioned disadvantages or prior art fluid energy conversion systems with the use of load-matching transformer means coupled between the fluid energy source and the load.

The present invention uses a variable transformer that matches a time-varying load to the optimum energy-transfer requirements of a fluid-energy-driven source, including, but not restricted to, a water-driven turbine and a wind-driven turbine. For rotating turbine, the goal of the controller for the transformer can be described by any one of four equivalent criteria. The choice of criterion depends on the particular system embodiment and on what variables are easiest to measure.

Criterion 1: Regulate the transformer to achieve the optimum tipspeed ratio of the turbine under the widest possible range of source and load variation. Tipspeed ratio is defined as the ratio of tangential speed at the turbine tip divided by fluid flow speed ahead of the disturbing influence of the turbine. Constant tipspeed ratio implies that turbine angular velocity is proportional to fluid flow velocity. Criterion 1 is valid even with large variation in density of the fluid energy source.

Criterion 2: For substantially constant energy source fluid density, turbine torquer should vary in correct proportion to the square of turbine angular velocity. If this relationship is satisfied, an optimum tipspeed ratio will result.

Criterion 3: For substantially constant energy source fluid density, turbine shaft power should vary in correct proportion to the cube of turbine angular velocity. If energy conversion efficiency is known, measured system output power may be used to compute turbine shaft power. This criterion may be particularly convenient for electrical systems, since wattage measurement is fairly straightforward.

Criterion 4: For substantially constant energy source fluid density and where shaft rotation is translated into a reciprocating stroke, average energy absorbed from the turbine on each stroke should vary in proportion to the square of turbine angular velocity. Peak acceleration of the reciprocating part is proportional to the square of the shaft angular velocity.

All four criteria compensate for variability in both the fluid power source and the load. Except for the first criterion, they are limited to constant fluid density and, importantly for a turbine in front of a hydropower nozzle, they are limited to constant cross-sectional area of the energy-carrying flow. If the size of a jet of water or other fluid hitting the turbine is allowed to vary, optimum tipspeed ratio is not substantially affected, however, torque and power increase in proportion to flow cross-section. Since torque and power are also proportional to fluid density, it can be said that torque and power should be scaled to the product of density times flow area. With this in mind, it is possible to generalize criteria 2 through 4 such that following the phrase "square of turbine angular velocity" there is added the phrase "multiplied by the product of density times flow area".

For certain turbines with very poor low-speed torque, the turbine may remain stalled at low or zero angular velocity even when loaded with a transformed torque that varies as the square of angular velocity in optimum proportions. Such a turbine may need a boost to start. A Darrieus wind turbine is an example of such a turbine. Turbine starting may be needed before the above control criteria become applicable.

The present invention relates particularly to reciprocating piston pumps, including gas compressors. These devices are efficient at dealing with variable-head water pumping, hydraulic fluid pumping and gas compression for compressed air and heatpump/refrigeration purposes. These devices frequently require substantial compensation for time-varying load conditions. For these devices, valve timing is an effective way to achieve variable power transformation. There are three related approaches to variable transformation of energy through valve control. The best approach depends on particulars of the system.

In a first approach, the pump cylinder(s) may be caused to pump on some but not all strokes for reduced average torque to the wind turbine shaft. During non-compression strokes, the pump cylinder(s) remains connected to the low-pressure manifold either through the inlet valve or through a separate compression relief servovalve. Turbine angular velocity will jitter somewhat with short-term variation in transformed torque, but the flywheel effect of the turbine will smooth angular velocity sufficiently to permit efficient operation. Coupling to the compresor cylinder (s) may be direct or via an RPM-changing transmission, usually a step-up transmission. An extra flywheel may be included in the system, and in the case of a step-up transmission, a flywheel on the high-speed side is most effective. If torque jitter in the transmission or in the wind turbine causes fatigue or wear or noise problems, a torsionally-compliant coupling may be placed between a flywheel on the pump shaft and either the transmission or the turbine. Note that this approach is applicable to both compressible and substantially incompressible fluids.

In a second approach, which applies to substantially incompressible fluids, each compression stroke begins in normal fashion; however, after a certain fraction of a cylinder's contents have been pumped, a bypass valve may terminate pumping for the remainder of the stroke once the fluid has lost its kinetic energy and stopped. Energy transfer per stroke is the integral of fluid pressure times displacement integrated up to the moment the bypass valve dumps pressure. A control device adjusts compression relief valve timing to achieve proper average loading according to one of the aforementioned loading criteria. Operation is smoother using this approach, although flywheel energy storage is still reqired to a small degree.

A third approach applies to compressible fluids. If compression relief were applied during the compression stroke, as in the previous approach, energy would be lost to decompression of the compressed cylinder contents. However, it is possible to relieve compression starting at the beginning of the pumping stroke and to then close the compression relief valve (which may also be the inlet valve) during the course of the stroke, allowing compression and pumping of the remaining cylinder contents. Some fluid kinetic energy will be converted to acoustic energy when the valve interrupts flow. Low-speed piston and generous bypass valve geometries will help minimize this loss. End-of-stroke dead volume becomes more significant when compressed volume per stroke is reduced by late valve closure.

Another object of the present invention is to control the timing of fluid relief valves communicating with a cylinder in correlation with piston movement to maximize energy transfer from a fluid energy source to the load by controlling the period during which the source is coupled to the load.

A further object of the present invention is to maximize energy transfer between a fluid energy source and a load by varying a transformer responsive to the source and/or the load.

The present invention is generally characterized in a fluid energy conversion system including a fluid energy source, a load, and a transformer coupled between the energy source and load for substantially continuously matching the load to source, within predetermined limits for the source and the load, such that substantially maximum energy transfer takes place substantially continuously, the transformer including fluid relief means for controlling the period during which the source is coupled to the load.

The present invention is further generally characterized in a fluid energy conversion system including a variable fluid energy source, a variable load, and a transformer responsive to the energy source and load for substantially continuously matching the source and load, such that substantially maximum energy transfer takes place substantially continuously, the transformer including fluid relief means for controlling the period during which the source is coupled to the load.

Other objects and advantages of the present invention will become apparent from the following description of the preferred embodiment taken in conjunction with the accompanying drawings.

DESCRIPTION OF THE PREFERRED EMBODIMENT

Figure 1:
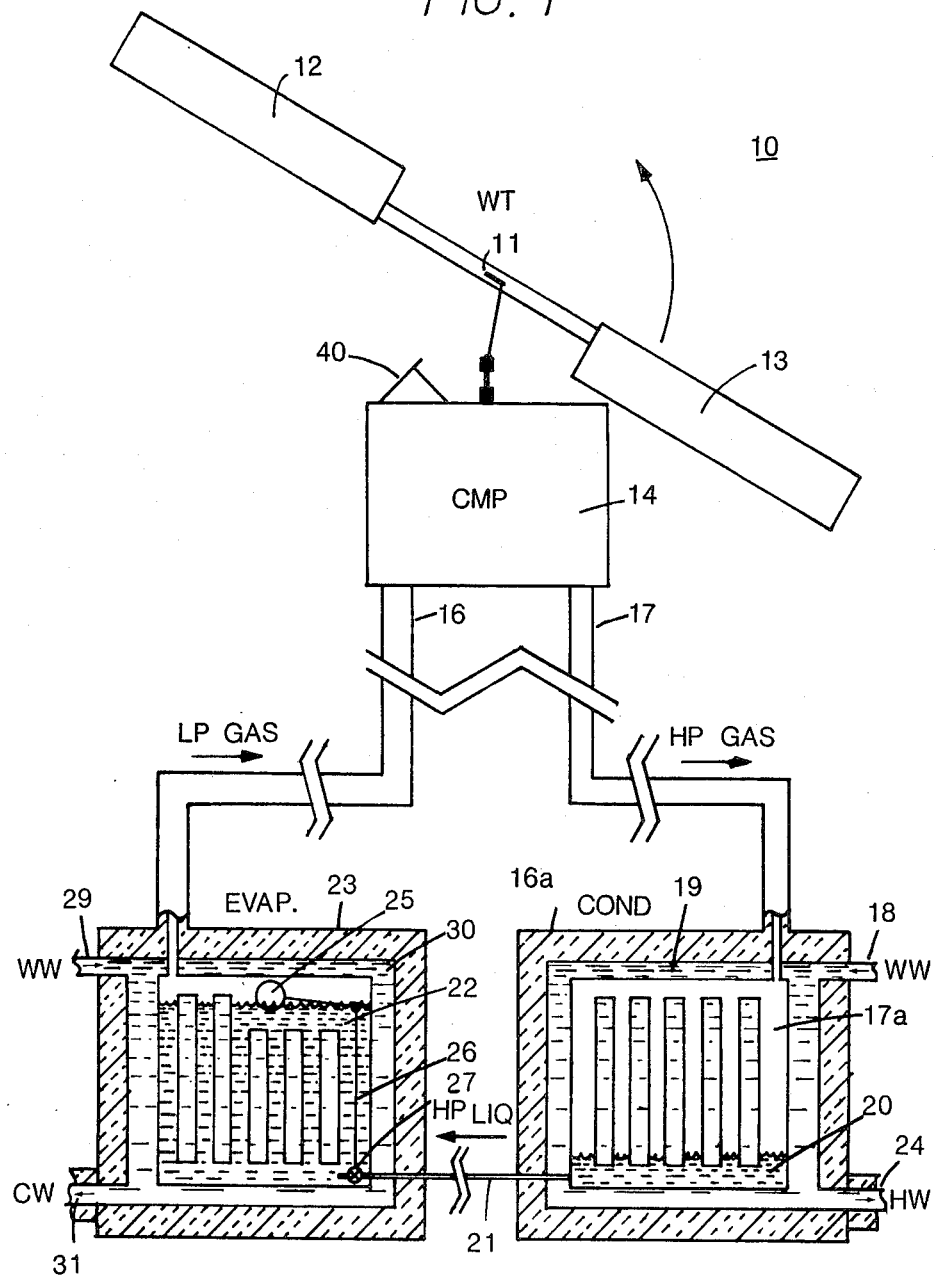
FIG. 1 is a view of an energy conversion system of the present invention having a wind turbine driving a heat pump.

An energy conversions system 10 according to the present invention is illustrated in FIG. 1 and includes a windmill or wind turbine driving a heat pump. The turbine has blades 12 and 13 connected with and rotating a shaft 11 which is coupled to a compressor 14, shown in more detail in FIG. 2. The compressor preferably is located just below the turbine on a tower supporting the wind turbine. A solar battery is used, as will be described in greater detail below, to power the electronic controls as well as the valves. Transmission line 17 transmits high pressure gas (or fluid), for example propane, to a condenser unit 16a which includes a condensation chamber 17a. Warm water is introduced, via a conduit 18, into a chamber 19 which surrounds the condensation chamber 17a. Condensed fluid 20 is transmitted through a conduit 21 under pressure to an evaporator 23. The warm water circulates around the condensing chamber 17a to exit conduit to emerge as heated water. As the condensed fluid is transferred under pressure from the conduit 21 into an evaporation chamber 22, a float 25 senses the level of the fluid and operates to permit fluid to enter until the entire chamber has been filled. The float is coupled through linkage 26 to a valve 27 at the outlet of conduit 21 to control the entrance of the condensed fluid under pressure. Warm water is introduced, via a conduit 29, into a heat-absorbing chamber 30 surrounding the evaporation chamber and exits as cold water through an exit conduit 31. It is apparent from the above description that hot water, cold water or both can be obtained from heat pump energy conversion system 10.

Figure 2:
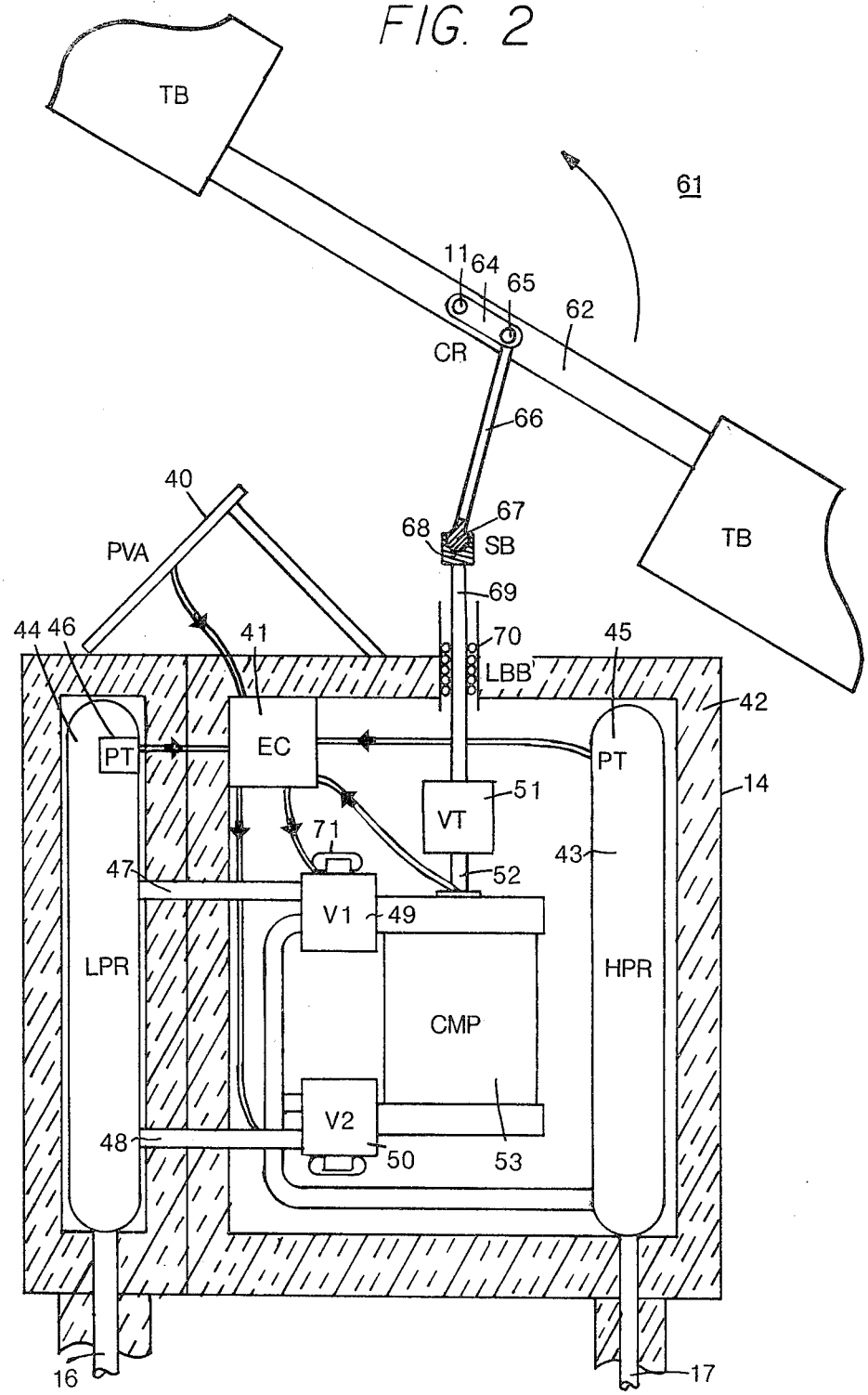
FIG. 2 is a view of the compressor and drive mechanism of the energy conversion system of FIG. 1.

Referring now to FIG. 2, there is illustrated in greater detail the compressor unit 14 including a transformer for matching the energy source to the load. A solar battery includes a photovoltaic array 40 coupled to an electronic control circuit with storage batteries 41. The walls of the compressor unit 14 are lined with insulation 42, and the compressor unit includes a high-pressure reservoir 43 and a low-pressure reservoir 44. A pressure transducer 45 in the high-pressure reservoir 20 senses pressure and produces an electrical signal which is coupled to the electronic control circuit 41. A second pressure transducer 46 located in the low-pressure reservoir 44 is also coupled to the electronic control circuit 41. The two reservoirs are insulated from each other, as shown, except for conduits 47 and 48 leading to relief valves 49 and 50, respectively. A velocity transducer 51 is coupled between shaft 69 and cylinder 53 and is electrically coupled to the electronic control circuit 41. Low and high pressure reservoirs 44 and 43 are coupled, respectively, to conduits 16 and 17.

The wind turbine, generally indicated at 61, has a blade shaft 62 rotatably fixed to a rotary bearing (not shown) about the turbine shaft 11 which is coupled through a linkage plate 64 to a crank pin and second rotary bearing 65 (not shown in detail) at the end of a reciprocating drive shaft 66 coupled to a ball joint 67 to provide a spherical bearing with housing 68. The housing 68 is affixed to a piston shaft 69 extending through a linear ball bushing 70 to the velocity transducer 51, the piston shaft being coupled at 52 to the piston (not shown) in the cylinder 53.

Figure 3:
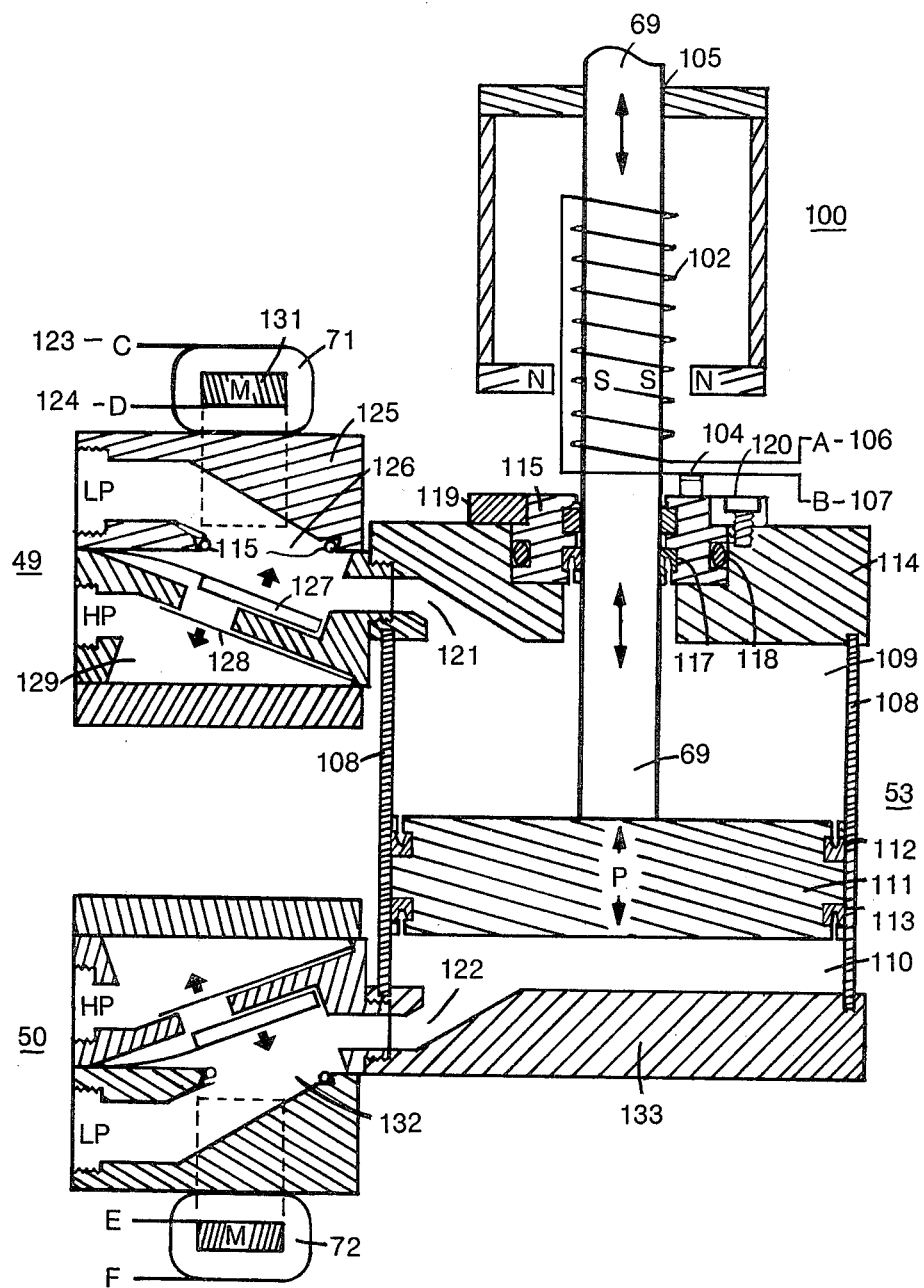
FIG. 3 is a side elevation of the compressor cylinder, valves and velocity transducer of the compressor of FIG. 2.

As shown in FIG. 3, which illustrates the cylinder in relation to the velocity transducer and the relief valves, a chamber of the cylinder 53 is coupled to the upper relief valve 49 including a valve assembly operated by a solenoid 71 while a solenoid 72 operates the lower valve assembly. A permanent magnet, generally indicated at 100, has an annular, disc-shaped north pole and is attached to the piston shaft 69 which is magnetized with the south pole. Examples of a cylinder useful in the present invention are Hydroline cylinder model R2 for air, Hydroline model LR2 for air permanently lubricated and Hydroline model HR2 for hydraulic medium pressure. The cylinder is illustrated and described in catalogue No. SR2-64, Rev. 12/79, dated 1979 distributed by Hydroline Manufacturing Co., 4950 Marlin Drive, Rockford, IL 61130. A voice coil 102 is affixed to the cylinder at 104, and the magnet cylinder 100 is affixed to the shaft 69 at a circumferential contact 105. Thus, the shaft becomes a part of the magnet core to present a south pole at the air gap (through which the voice coil moves) which moves up and down over coil 102. Motion of the piston, thus, causes the voice coil to cut the lines of force between the north and south poles to generate a voltage at the output indicated at A and B and 106 and 107, respectively, for coupling to the electronic control circuit 41. A cylinder wall 108 encloses an upper chamber 109 and a lower chamber 110, and a piston 111 is affixed to the piston shaft 69 within the cylinder wall 108. Fluid, self-sealing, inflatable seals 112 and 113 are fixed to the piston and move with it to maintain the seal in the cylinder. The cylinder has a cap 114 which carries a shaft seal assembly 115 and a pair of inflatable annular seals 116 and 117. An O-ring seal 118 seals the seal assembly to the cap 114. A retainer ring 119 is fastened, for example by a screw or bolt 120 to the cap 114. A port 121 extends from the upper chamber 109 to the relief-valve assembly 49. A port 122 extends from the lower chamber 110 to the relief-valve assembly 50. A cap 133 closes chamber 110.

Referring now to the upper relief-valve assembly 49, the solenoid 71 has connections 123 and 124 coupled to the electronic control circuit and is mounted on a valve housing 125 having a chamber 126 therein communicating with conduit 47 through a low-pressure outlet and a chamber 129 therein having a high-pressure outlet communicating with high-pressure reservoir 43. A valve member 127 carries an armature controlled by a core 131 of solenoid 71. An electric pulse to solenoid 71 closes member 127 against O-ring 115, isolation chamber 126 from conduit 47. Pressure buildup in chambers 109 and 126 maintains member 127 closed after initial magnetic closure and until the end of the compression stroke. A reed valve 128 is disposed adjacent the valve seat and is operated by differential pressure thereacross. Pressure buildup following magnetic closure of member 127 causes reed 128 to open. The valve assembly 50 is similar in structure with the valve assembly 49 and is not described in detail again, it being appreciated that a chamber 132 therein communicates via a low pressure outlet and conduit 48 with low-pressure reservoir 44 while the upper chamber in the valve housing communicates via a high pressure outlet to the high-pressure reservoir 43. The solenoid operated valve members 127 of valves 49 and 50 are normally open to relieve the respective chambers in the cylinder; and, therefore, no compression can take place until such time as the valves are closed.

Figure 4:
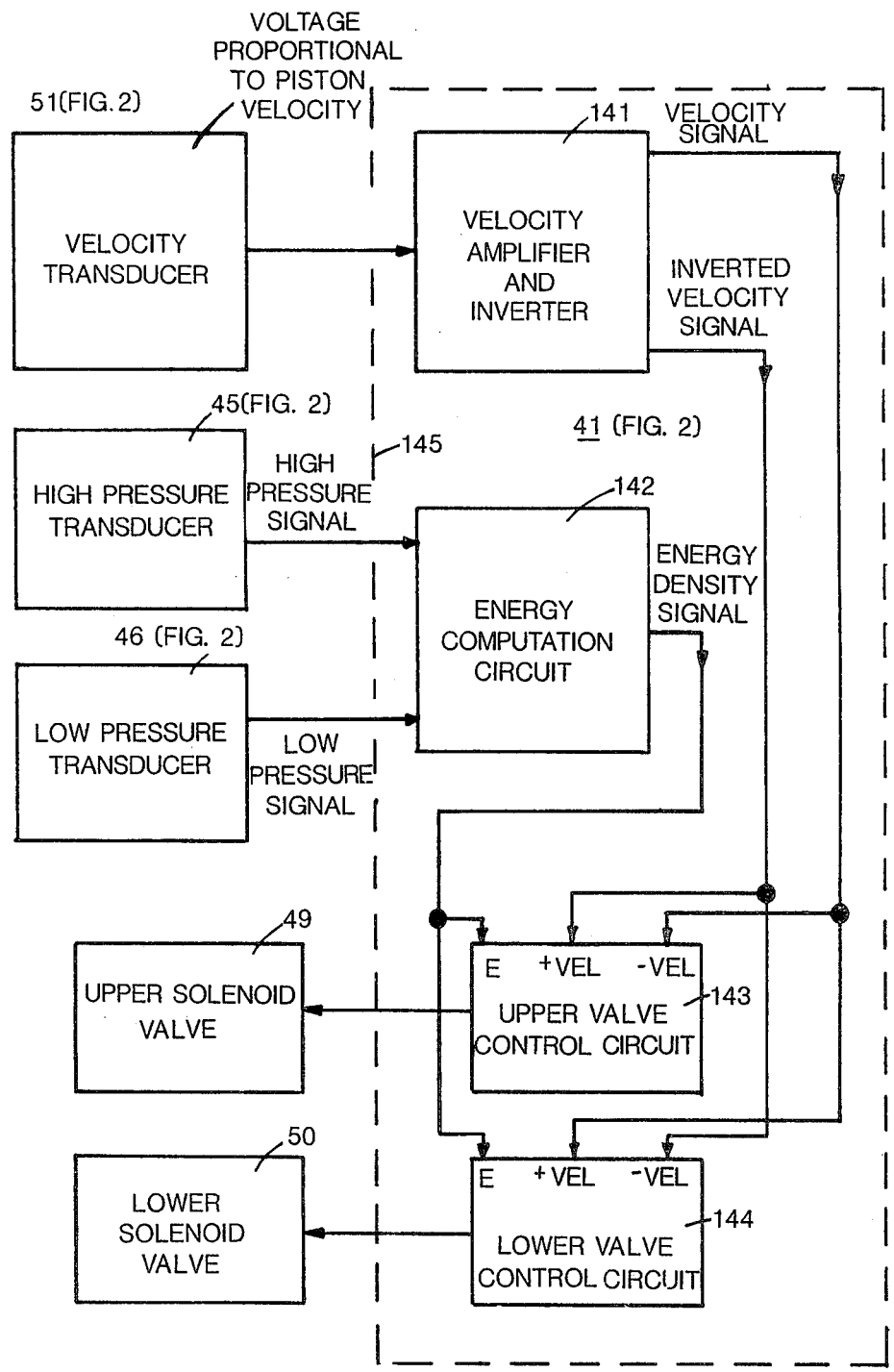
FIG. 4 is a block diagram of the electronic control circuit for the compressor of FIG. 2.

Referring now to FIG. 4, the electronic control circuit 41 is illustrated receiving inputs from the velocity transducer 51, the high pressure transducer 45 and the low pressure transducer 46 with the outputs of the electronic control circuit coupled to the solenoid operated valves 49 and 50. More specifically, the velocity transducer 51 is coupled to a velocity signal amplifier and inverter 141 which produces an output velocity signal coupled to the plus velocity side of a lower valve control circuit 144, and an inverted output velocity signal coupled to the negative velocity side of the lower valve control circuit 144. The ouput velocity signal is also coupled to the negative velocity terminal of an upper valve control circuit 143 while the inverted output velocity signal is also coupled to the positive velocity terminal of the upper valve control circuit 143. An energy computation circuit 142 derives an input from the high pressure transducer 45 and another input from the low pressure transducer 46, and the energy computation circuit 142 produces an energy density signal which is coupled to terminals E of the valve control circuits 143 and 144.

The solenoid valves operate reciprocally relative to each other and precisely 180 degrees out of phase. The output of the upper valve control circuit 143 is coupled to the upper solenoid valve 49 while the output of the lower valve control circuit 144 is coupled to the lower solenoid valve 50.

Figure 5:
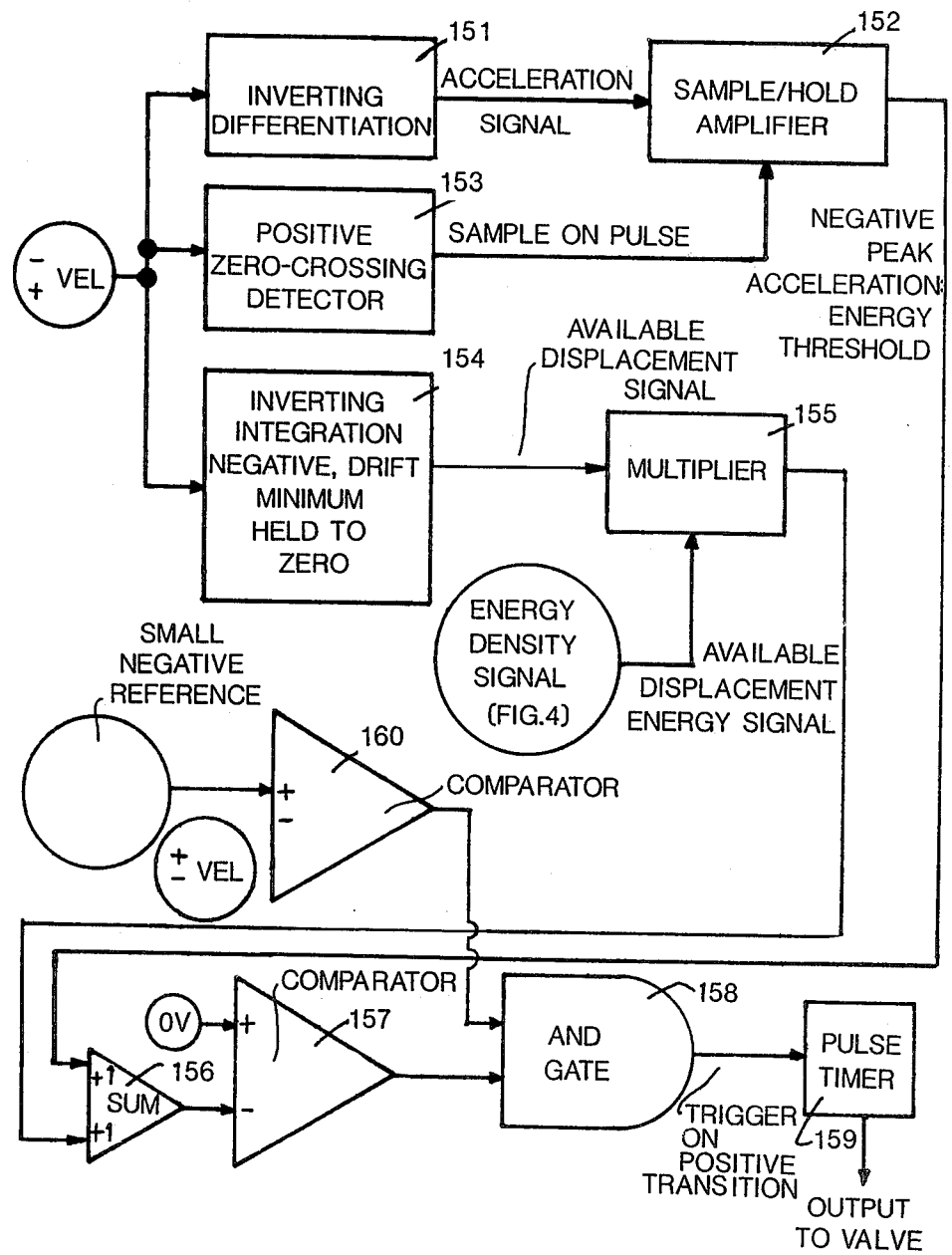
FIGS. 5 and 7 are, respectively, schematic block diagrams of pneumatic and hydraulic valve control circuits for the energy conversion system of FIG. 1.
Figure 7:
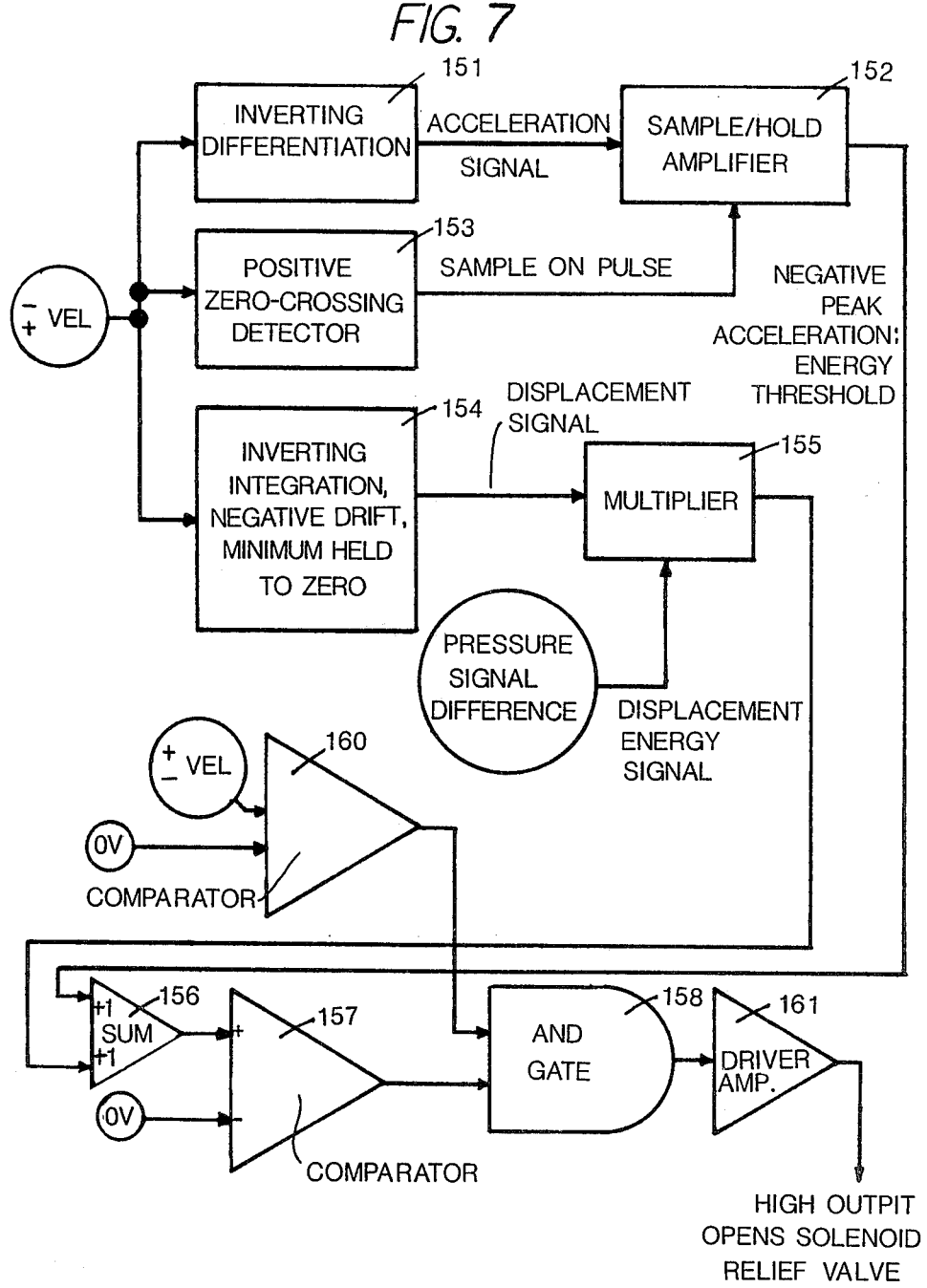

A pneumatic valve control circuit is illustrated in FIG. 5, and this circuit, with only a change in connection, can be used for either the upper valve control circuit 143 or the lower valve control circuit 144. FIG. 7 illustrates a hydraulic valve control circuit with the essential differences between the pneumatic and hydraulic valve control circuits being that, under hydraulic conditions, energy transfer starts immediately with the stroke and is maintained until it gets a signal to stop after the desired amount of energy has in fact been transferred. This implies that the solenoid relief valve is normally closed and must be held open in order to terminate the energy transfer cycle.

The valve control circuit of FIG. 5 receives the two amplified and inverted output velocity signals 180 degrees out of phase from velocity amplifier and inverter 41 depending upon whether the circuit is also used for the upper or lower valve. An inverting differentiation circuit 151 produces an acceleration signal which is sampled based on an enabling pulse provided by a positive zero-crossing detector 153. A sample/hold amplifier 152 produces an output signal that is a measure of peak negative acceleration and provides a measure of the energy transfer required by the system. An inverting integrator 154 produces an available displacement signal which is supplied to a multiplier 155 along with the energy density signal supplied by energy computation cicuit 142. The output of the multiplier 155 is an available displacement energy signal which is coupled to a summing amplifier. The other input to the summing amplifier is the negative peak acceleration from sample/hold amplifier 152. The output is supplied to a comparator 157 and compared with a zero reference voltage. The comparator output is applied to an input of AND gate 158. If the output of the comparator is positive, it creates an enable condition for the output of the AND gate. Another comparator 160 compares the velocity output signal from velocity amplifier and inverter 141 with a reference voltage; and, if the velocity is sufficient, the output of the comparator 160 is positive and the AND gate 158 produces a trigger on a positive transition to produce a pulse that is supplied through a pulse timer 159 to the solenoid valve to hold the member closed as shown in FIG. 3.

More particularly, referencing the lower valve control circuit, the negative or inverted velocity signal is supplied to inverting differentiation circuit 151 and to positive zero-crossing detector 153, and to inverting integrator circuit 154. The integrator 154 has a negative drift with a minimum held to zero. The output of the zero-crossing detector is an enabling pulse which is coupled to the sample/hold amplifier 152. The output of the integrator 154 is an available displacement signal, i.e. the measure of the remaining volume in the cylinder 53. The available displacement signal is coupled to a multiplier 155 deriving another input from the energy density signal produced by the energy computation circuit 142. The multiplier 155 produces an output available displacement energy signal coupled to summing amplifier 156 which receives as its other input the peak acceleration signal derived from the sample/hold amplifier 152. The output of the amplifier 156 is supplied to a comparator 157. The plus terminal of the comparator 157 is grounded to provide a zero volt reference while the output of the amplifier 156 is supplied to the negative terminal of the comparator 157. The output of the comparator 157 is supplied to one input of AND gate 158. Comparator 160 derives an input at its positive terminal of a small negative reference voltage while the input to the negative terminal is the positive or non-inverted velocity signal. The output of the comparator is coupled to the AND gate 158, and the output of the AND gate triggers on positive transition a pulse timer 159 which produces an energizing pulse output to the solenoid valve.

When the circuit shown in FIG. 5 is used as an upper valve control circuit, the phase or polarity of the input velocity signals are reversed such that the input to the differentiator 151, the zero-crossing detector 153, and the integrator 154 is positive or non-inverted and the input to the comparator 160 is negative or inverted.

The operating conditions for the valve control circuit will be discussed with respect to five conditions:
  a. below the minimum threshold
  b. in the minimum range
  c. in the medium range
  d. at the maximum range
  e. greater than the maximum range.

Below the minimum threshold the velocity input to the comparator 160 is insufficient to produce a plus signal to the AND gate; and therefore, no output can be produced irrespective of the relationship between the peak acceleration and the available displacement energy signal.

In the minimum range, the acceleration signal is in the same range as the available displacement energy signal so that the summing amplifier 156 produces a zero. The output of the comparator 157 then supplies a one to the AND gate; and since the output of the comparator 160 reflects the actual velocity of the piston shaft as being large enough to confirm that there is available energy, the AND gate triggers on a positive transition to trigger the pulse timer 159 to produce a pulse output to the solenoid valve. This is true throughout the operating range, the difference between minimum, medium and maximum ranges pertaining to when the energy transfer takes place and, in particular, relating to when the solenoid valve is energized for the purpose of establishing communication with the high pressure reservoir 43.

Within the normal operating range from minimum to maximum, the signal supplied to AND gate 157 from the comparator 160 is on or enabling shortly after the compression stroke starts. At the upper range or the maximum normal operating condition, the signal starts almost immediately after the beginning of the stroke and varies depending upon the velocity of the piston which is a function of the angular velocity of the wind turbine shaft. During normal operating range when the available displacement energy signal from the multiplier 155 is greater then the negative peak acceleration energy threshold from the amplifier 152, the comparator 157 output is a disabling signal and, therefore, waits until the available displacement energy has dropped to a point where it is less than or equal to the negative peak acceleration. Above the normal maximum operating condition, the valve is closed most of the time to communicate directly from the lower cylinder chamber to the high pressure reservoir. It will, of course, be operating at that point at less than optimum for energy transfer.

Figure 6:
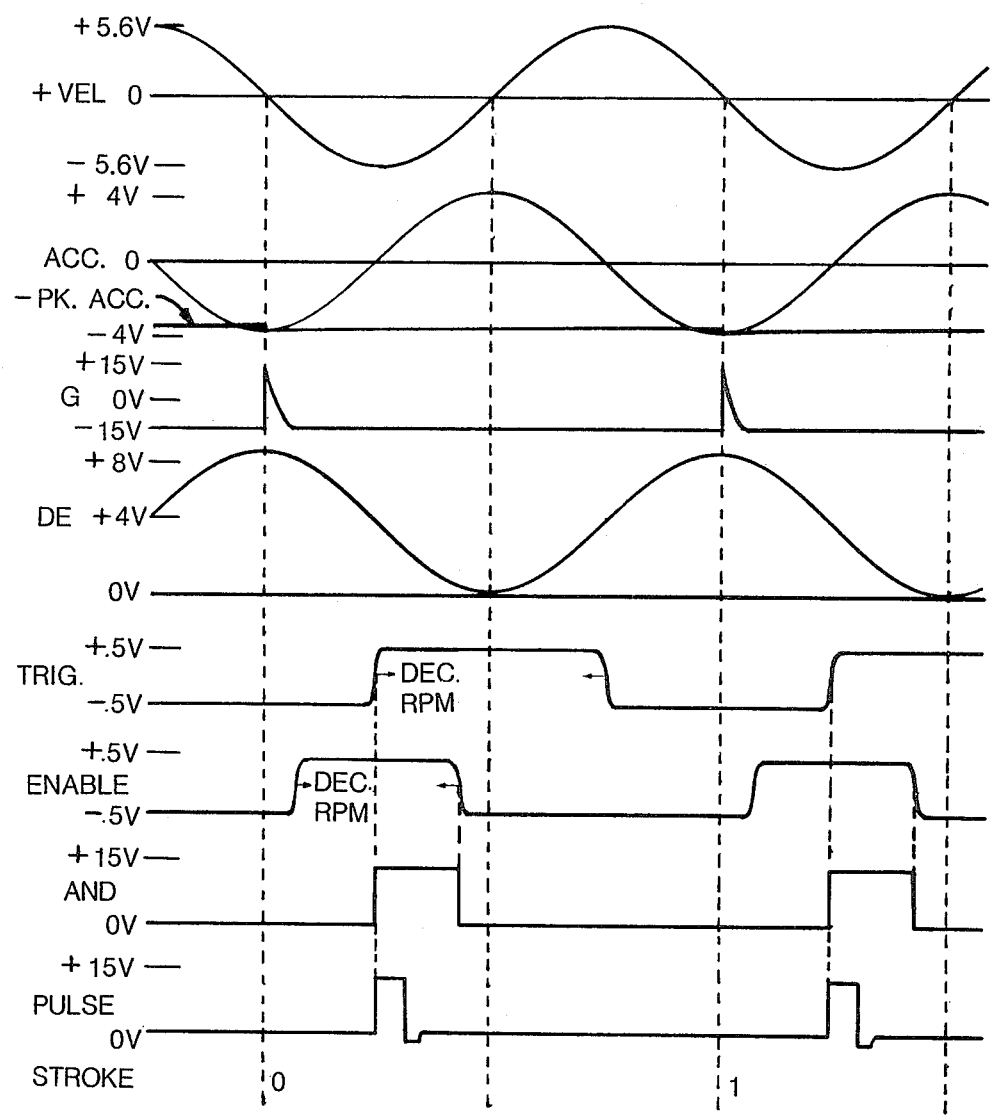
FIG. 6 illustrates waveforms for the control circuit of FIG. 5.

Referring now to FIG. 6, there is illustrated a series of waveforms relating to the operation of the electronic control system for the lower valve control circuit. When the velocity goes negative correlates with the compression stroke for the lower chamber, and when the velocity goes positive correlates with the intake stroke for the lower chamber. The waveforms shown are for velocity, acceleration, G which is the sample trigger corresponding with peak acceleration, and DE which is the available displacement energy remaining in the chamber which is a maximum at the beginning of the compression stroke and a minimum at the end. A window marked trigger, or Trig., is an enabling window in combination with the enabling curve, and the enabling window, Enable, corresponds with the output of the comparator 160 in FIG. 5 while the trigger window corresponds with the output of the comparator 157. The output of the AND gate 158 is labelled AND, and the output of the pulse timer 159 is labelled Pulse and its occurence with respect to the compression stroke is indicated as shown. The curve labelled trigger actually operate during the rise time from −0.5 volts to a maximum of +0.5 volts. That positive transition prodices a trigger if it occurs within the window provided by the enabling gate.

Referring now to FIG. 7, there is illustrated a simplified schematic block diagram of a hydraulic valve control circuit for use with incompressible fluid. This control circuit is substantially identical in structure and operation to the circuit of FIG. 5 and identical parts are given identical reference numbers; the primary differences being that the output of the summing amplifier 156 is connected with the positive input of comparator 157 while the negative input is grounded and that the pulse timer is replaced with a driver amplifier 161. In the case of a hydraulic system, the solenoid relief valve is normally closed so that compression begins immediately on the compression stroke and is terminated by opening the solenoid relief valve, and for this reason the driver amplifier 161 is used. Another difference is that the velocity input is connected to the positive input of the comparator 160 and zero volts or ground is connected to the negative input of comparator 160. The output of the driver amplifier is a continuous energizing signal for the solenoid relief valve during that portion of the stroke during which energy transfer is terminated.

Figure 8:
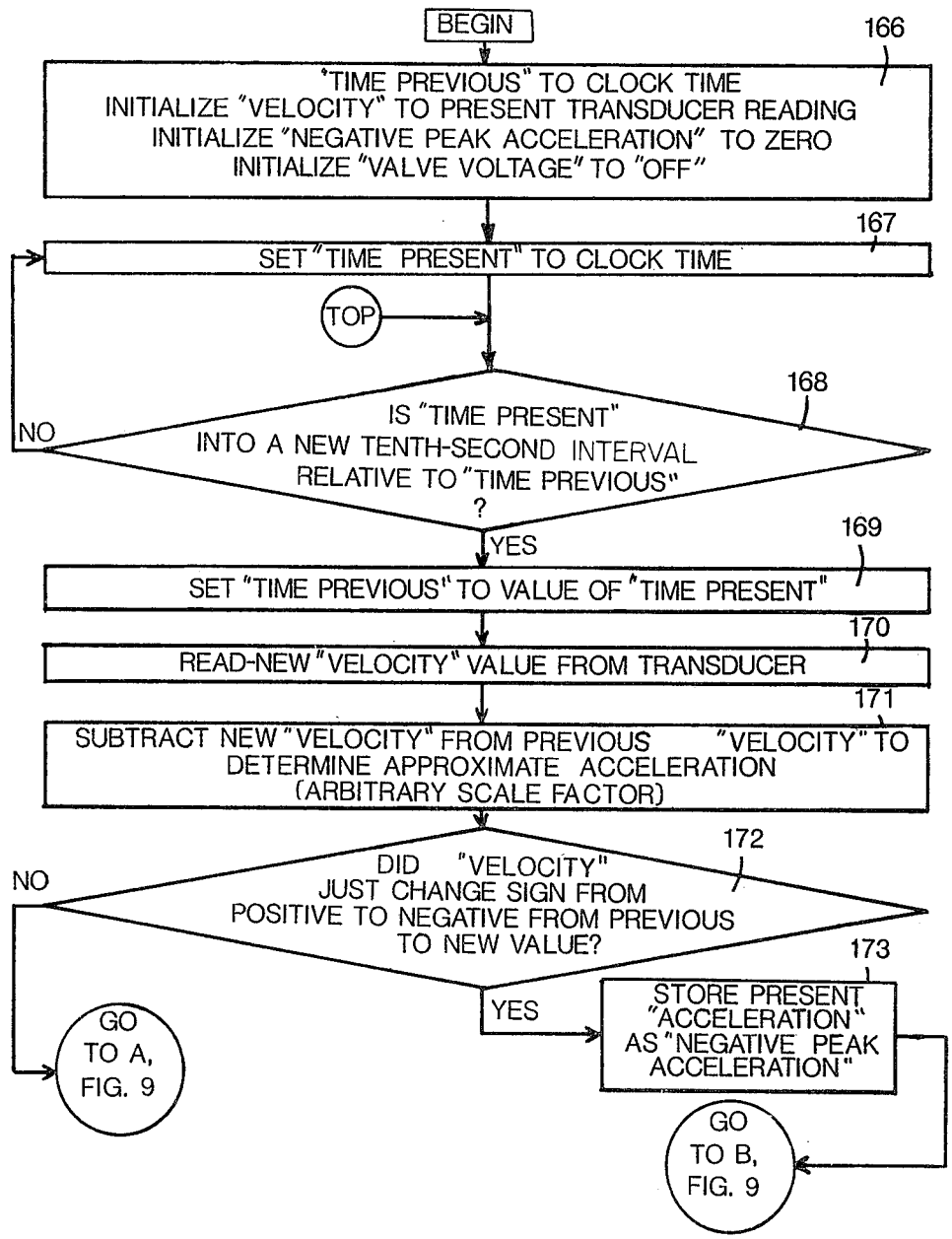
FIGS. 8, 9 and 10 are flow charts representing digital operation of an energy conversion system according to the present invention.
Figure 9:
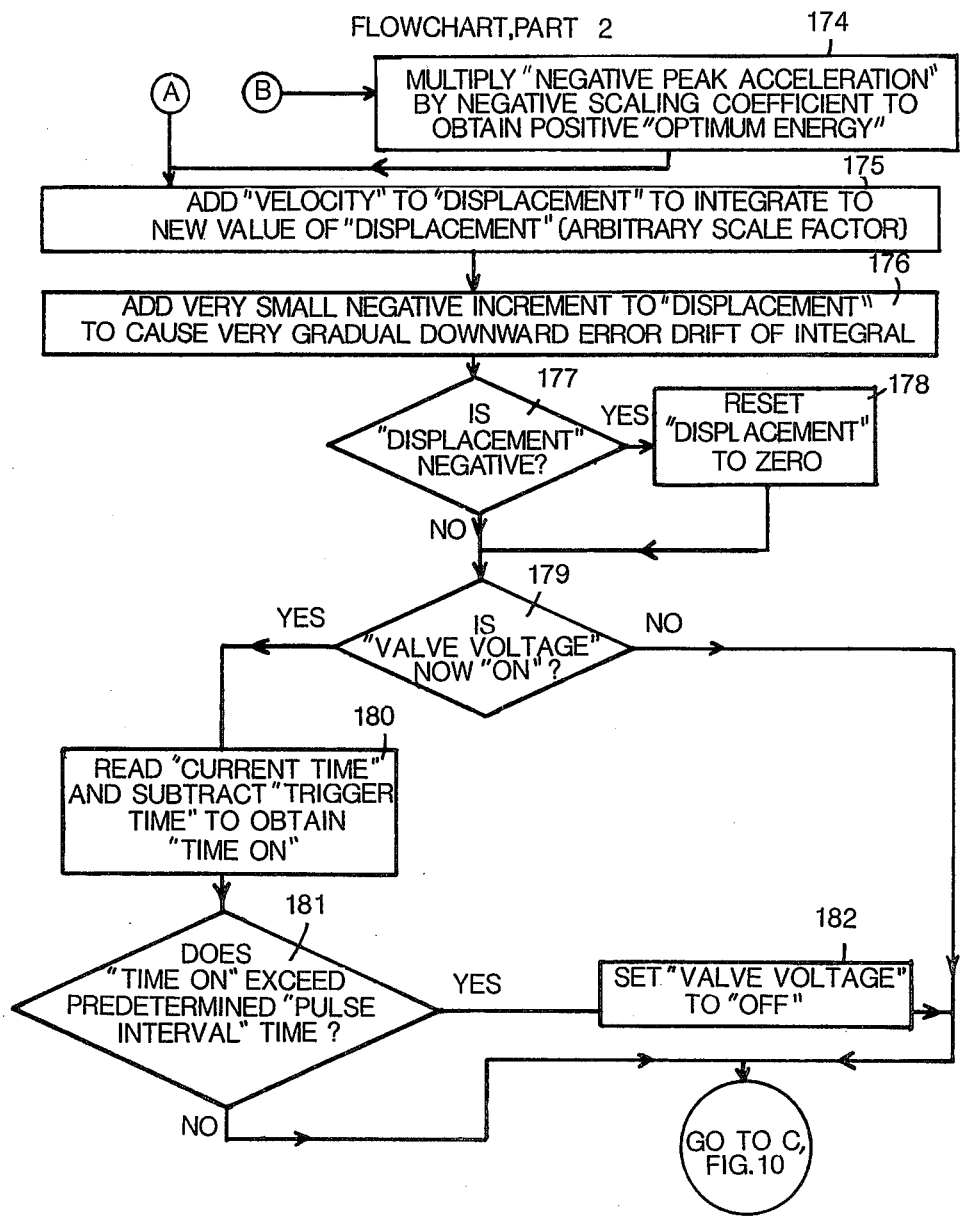
Figure 10:
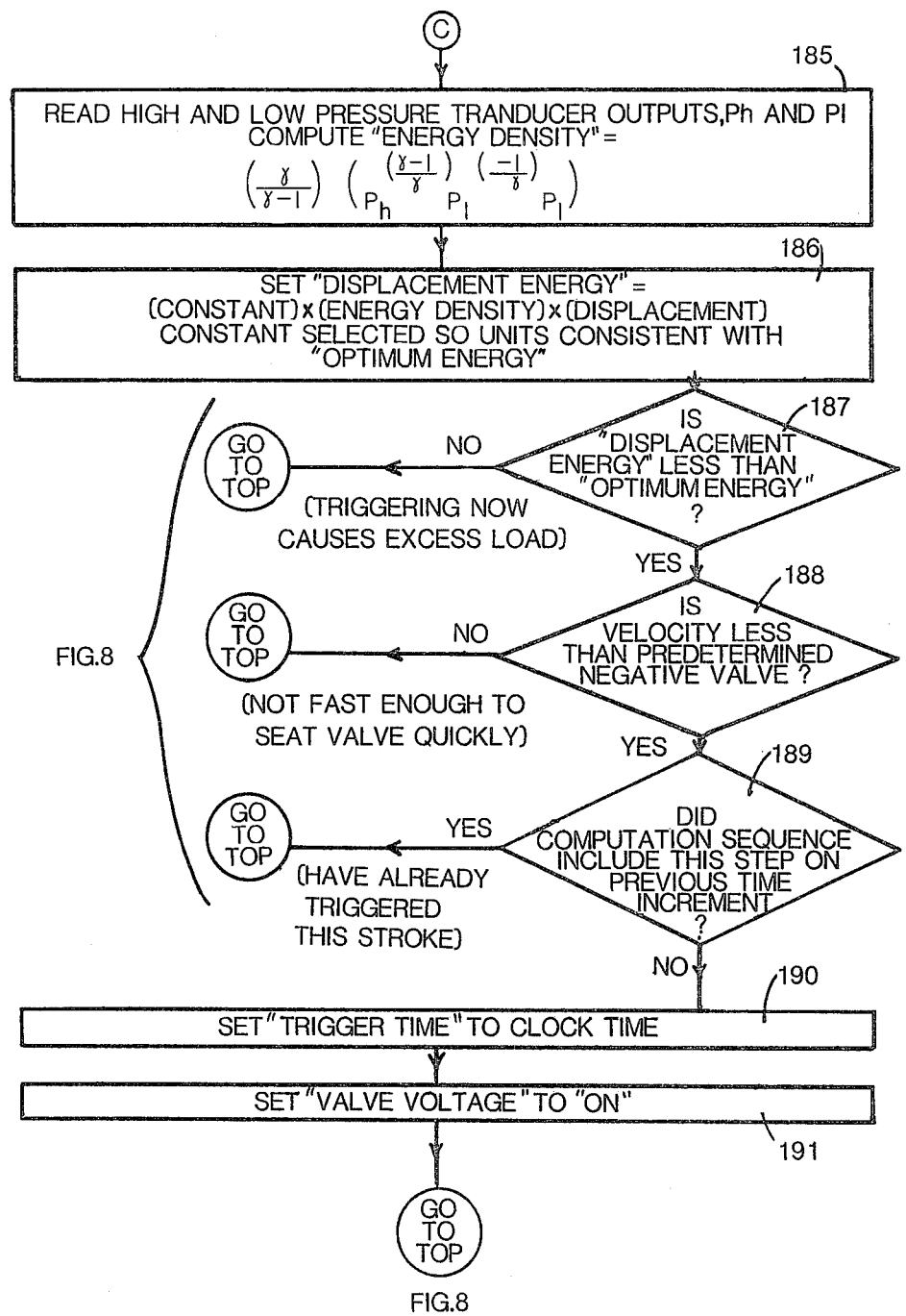

The operation of the system has been broadly described with respect to FIGS. 1 through 7. The system as described and illustrated in those figures is essentially an analog circuit. The logic sequence chart or flow chart of FIGS. 8 through 10 represents the operation of a digital system for accomplishing the same results.

Such a digital system would have means for providing a continuous indication of time a block for presenting the velocity transducer reading, means for resetting the negative peak acceleration to zero, means for resetting the displacement to zero and means for resetting the valve voltage to off. While the logic sequence diagram FIGS. 8, 9 and 10 operates with respect to .1 second time intervals, any convenient time interval may be chosen, provided that the interval is long enough to permit completion of the computation sequence and short enough to give adequate time resolution in relation to maximum angular velocity.

Figure 11:
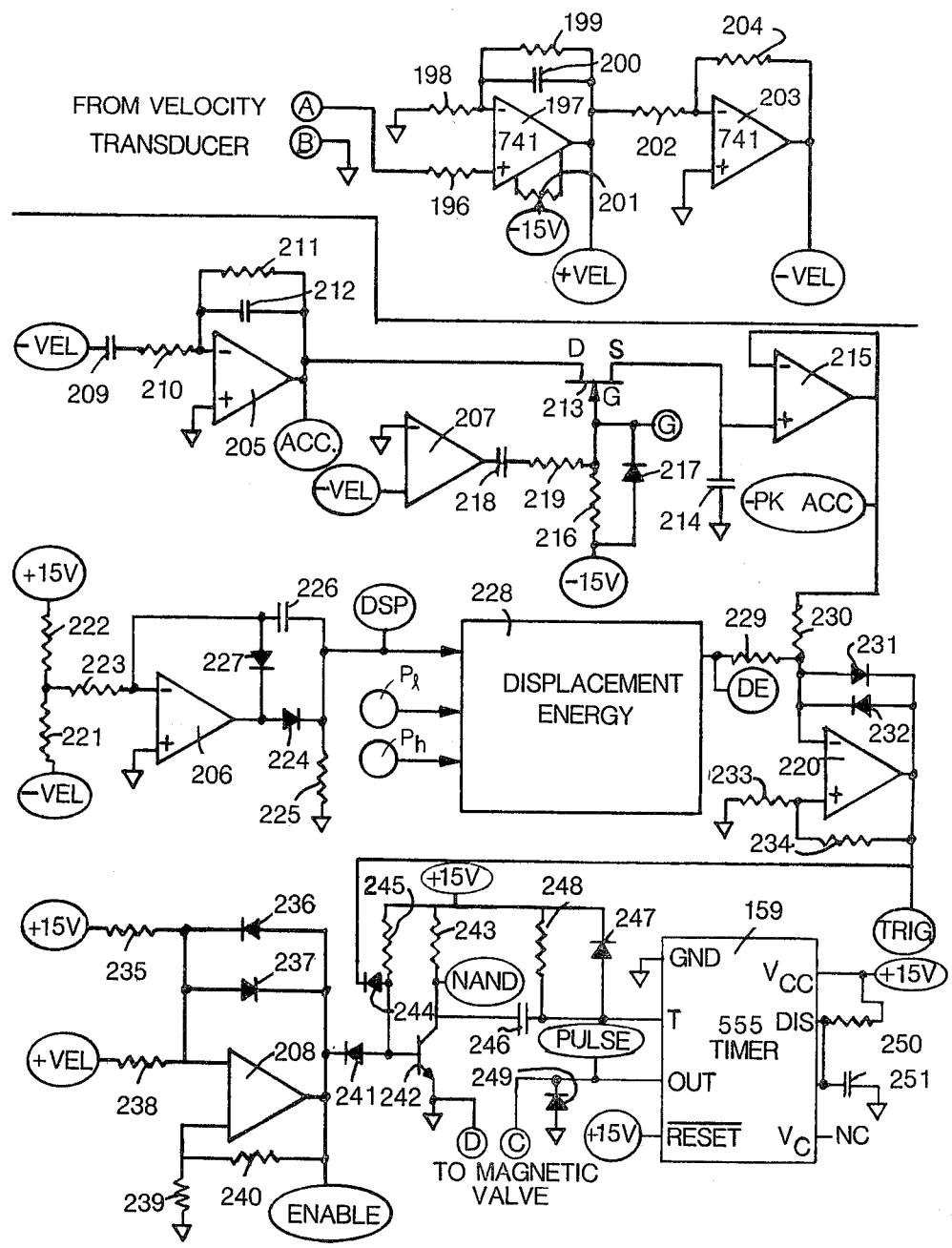
FIG. 11 is a more detailed schematic diagram of the control circuit of FIG. 5.
Figure 12:
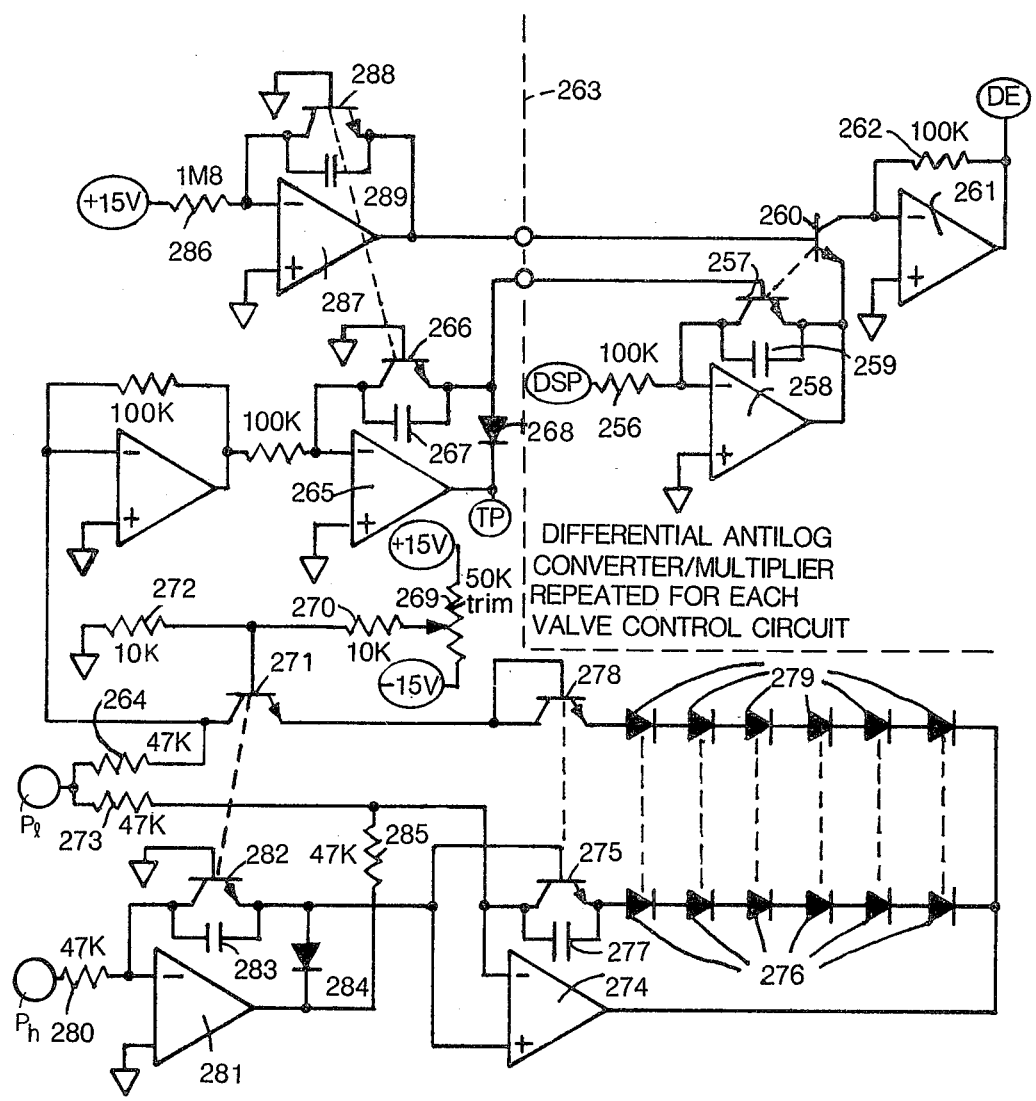
FIG. 12 is a schematic diagram of the displacement energy computer circuit of FIG. 11.

One of the principal differences between the analog circuit and the digital circuit is that the equivalent of actual differentiation and integration as takes place in the circuits presented in FIGS. 11 and 12 become numerical differentiation and numerical integration when processed digitally.

An initializing block 166 is coupled a set time preset block 167 which is coupled to a decision block that asks the question "Is time present into new interval?" If the answer is no, "time previous" is reset and updates. If the answer is yes, it (i.e., program control) goes on to set time previous block 169 so that the time is set to start on an integral number of 0.1 seconds. The block 169 is coupled to a read new velocity value block 170, block 170 is coupled to a subtract new velocity from previous velocity block 171. The block 171 is coupled to a decision block 172 that asks "Did velocity change sign?" If yes, it (i.e., program control) is coupled to store present acceleration block 173 which is coupled with multiply peak acceleration by negative scaling coefficient block 174 via B in FIG. 9. If no, it goes to A in FIG. 9. Blocks 174 and 172 are coupled to add velocity to displacement block 175 which is coupled to add small negative increment to displacement block 176 and then to decision block 177 that asks "Is displacement negative?" If yes, it goes to reset displacement to zero block 178 and then to decision block 179 that asks "Is valve voltage now on?" If the output of the decision block 179 is no, it is coupled directly to C in FIG. 10. If the output of the decision block 179 is yes, it is coupled to a read current time and subtract trigger time block 180 which is coupled to a decision block does time on exceed pulse interval block 181. If the answer is yes, it is coupled to a set valve voltage to off block 182. If no, it is coupled directly to C in FIG. 10.

In FIG. 10, C is coupled to the computer block 185 which solves for energy density. Energy density is defined as the energy per unit volume at low pressure associated with adiabatic compression and displacement to high pressure reservoir. $\gamma$ is defined by the equation $$\gamma = \frac{C_p}{C_v} \qquad (1)$$

where $C_p$ is the heat capacity for constant pressure for a unit mass, and where $C_v$ is the heat capacity at a constant volume per unit mass.

The energy density is then derived from the following equation $$\text{Energy Density} = \left(\frac{\gamma}{\gamma - 1}\right) \cdot \left(P_h^{(\frac{\gamma-1}{\gamma})} \cdot P_1^{(\frac{1}{\gamma})} - P_1\right) \qquad (2)$$

where $\gamma$ is defined above, $P_h$ is the high pressure reading from the transducer in the high pressure reservoir, $P_1$ is the low pressure reading from the transducer in the low pressure reservoir. The computer block 185 is then coupled to another computer block 186 which multiplies the energy density by displacement to determine the available displacement energy remaining, that is, how much of the volume in the compression chamber remains and what energy that represents. In this manner, the amount of energy that would be transferred as the bypass valve is closed is determined. Displacement energy is scaled to units consistent with optimum energy. The output of the computer block 186 is coupled to a decision block 187 which presents the question "Is displacement energy less than optimum energy?" If no, it recycles and goes to Top on FIG. 8. If yes, it goes to the next decision block 188 which asks "Is velocity less than predetermined negative value?" If no, it goes to FIG. 8 Top. If yes, it goes to another decision block 189 presenting the question "Did computation sequence include this step on previous time increments?" If no, it goes to set trigger time to clock time block 190 which is coupled to set valve voltage to on block 191. Control returns from block 191 to TOP in FIG. 8. If the block 189 answer is yes, it (i.e., program control) goes directly to TOP in FIG. 8.

The sequence of operations described above is performed rapidly and repetitively. The result is very close to the outcome of the analog computations obtained by the electronic valve control circuits described and illustrated with respect to FIGS. 1–7 and in FIGS. 11 and 12 below.

The computation flow begins with the system time clock reading an integral number of 0.1 second intervals. The interval 0.1 second is chosen to allow the entire sequence of computation to be performed within that interval in order to obtain smooth operation.

The displacement computation sequence introduces a small error into the integration of the velocity signal to produce a gradual negative error drift in displacement. The displacement signal tends to drop just below zero at the bottom of each stroke and is reset to zero which is a reference position representing no fluid left in the cylinder to displace. The compression stroke is defined as the period of decreasing displacement, i.e., volume, remaining in the compression chamber. It then becomes the period of negative velocity. In this sense, negative velocity implies compression. Positive velocity relative to one side of the piston is negative velocity, i.e. a compression stroke, relative to the opposite side of the piston. Thus, because of the reciprocating action between the two compression chambers and the corresponding valves, timing for one valve is repeated for the other valve with the sign of the velocity signal reversed.

A schematic circuit diagram of the valve control circuit of FIG. 5 is shown in greater detail in FIG. 11. The output of the velocity transducer shown in FIG. 3 is coupled to the input of a non-inverting, band limited amplifier. The gain is determined by selected resistance with offset trim, and the offset error of the amplifier is trimmed to zero. A typical gain for such an amplifier is 20DB. The output of the amplifier is a plus velocity signal corresponding with the signals obtained from the lower valve. Plus velocity is positive when the piston is moving upwardly, and negative velocity is negative when the piston is moving upwardly. For the other chambers, the reverse is true. When the piston is moving downwardly, plus velocity is negative and negative velocity is positive. The term "plus" and "minus" velocity relate to whether or not the velocity waveform is inverted. That is, when the plus velocity is positive, a positive voltage is produced by the velocity transducer. When the plus velocity is negative, the velocity transducer produces a negative voltage. The plus velocity signal is coupled to a unit inverting amplifier which produces a negative velocity signal.

The negative velocity signal is introduced into a band limiting inverting differentiation circuit which is coupled to a sample and hold amplifier. The sample and hold amplifier samples briefly as the negative velocity goes positive, then holds the negative peak value of the positive acceleration signal. The negative velocity is also coupled to an inverting integration circuit having a slow negative drift with the output held above 0 volts to yield available displacement volume remaining in the compression chambers; that is coupled to a computer for computing available displacement energy. The remaining displacement energy is derived from a circuit which multiplies a proportionality constant times displacement times a function of pressure in both the low and high pressure reservoirs, as shown in FIG. 5. this circuit is more completely described with respect to FIG. 12. The output of the remaining displacement energy computer circuit is coupled to an operational amplifier acting as a comparator with a small hysteresis to produce the trigger pulse shown in FIG. 6. The enable circuit of comparator 160, as shown and described with respect to FIG. 5, couples a reference voltage and the positive velocity signal to an operational amplifier to produce the enable signal shown in FIG. 6. The detailed realization of FIG. 11 is slightly different from the simplified version of FIG. 5 in that the detailed circuit uses a positive reference voltage summed with the negative velocity signal in a resistor network, the weighted sum being applied to the negative input of the comparator. An operational amplifier operates as the comparator with small hysteresis to permit triggering only when plus velocity is more negative than approximately 0.94 volts. This circuit prevents triggering at low speeds, and triggers near the beginning of compression strokes in high speeds. A NAND gate, corresponding to AND gate 158 with an inversion, is coupled to a pulse timer of approximately 30 milliseconds with a "free wheeling" diode to permit decay of magnetic valve current after an enabling pulse interval. Since the pulse timer responds to a negative input transition from the NAND gate, circuit function is equivalent to the AND gate coupling of FIG. 5, modules 158 and 159. The part of the circuit after the amplifier producing the plus velocity and negative velocity signals is identical for each valve. The only difference is that the plus velocity and negative velocity connections are interchanged.

The output of the velocity transducer shown in FIG. 3 is coupled to terminals marked A and B in the circuit of FIG. 11 and through a resistor 196 to an operational amplifier 197, the resistor 196 being coupled to the positive terminal of the amplifier 197. A resistor 198 is equal in resistance to the resistor 196 and is coupled from ground to the negative terminal of the amplifier 197. The output of the amplifier 197 is coupled to a resistor 199 in parallel with a capacitor 200 connected to the negative terminal of the amplifier 197. A trimmer potentiometer 201 is connected to the offset pins of the amplifier 197 and the tap is connected to a negative voltage supply, for example, −15 volts. The output of the amplifier 197 is a positive velocity signal. The output of the amplifier 197 is also coupled via a resistor 202 to the negative terminal of an operational amplifier 203, the positive terminal of which is grounded. The output of the amplifier 203 is coupled via a resistor 204 to the negative terminal of the amplifier 203, and the output of the amplifier 203 is the negative velocity signal such that the amplifier operates as a unit inverting amplifier to produce the negative velocity signal which is 180° out of phase with the positive velocity signal. The negative velocity signal is coupled to a band limiting differentiation circuit associated with an operational amplifier 205 and to an inverting integration circuit with an operational amplifier 206. The negative velocity signal is also coupled to the positive terminal of a comparator operational amplifier 207 having a grounded negative terminal. The positive velocity signal is coupled to a comparator circuit producing an enabling signal, as shown in FIG. 6, associated with an operational amplifier 208.

The negative velocity signal is coupled, more particularly, through a capacitor 209 in series with a resistor 210 to the negative terminal of amplifier 205, the positive terminal being grounded. The output of the amplifier 205 is coupled through a resistor 211 connected in parallel with a capacitor 212 to the negative terminal of the amplifier, the output of the amplifier 205 being the acceleration signal and being coupled to the drain of a field effect transistor 213. The source of the field effect transistor is coupled to ground through a capacitor 214 and to the positive terminal of an operational amplifier 215 in the sample and hold amplifier circuit.

The gate of the field effect transistor 213 is coupled through a resistor 216 to a source of negative voltage, for example −15 volts, with resistor 216 in parallel with a diode 217. The anode of the diode is connected to the negative supply, and the cathode is connected to the gate of the transistor 213. The waveform at the gate of the field effect transistor 213 is shown as G in FIG. 6. The output of the amplifier 207 is coupled through a capacitor 218 connected in series with a resistor 219 to the gate of the transistor 213. The positive input of amplifier 207 is "minus velocity" from amplifier 203, and the negative input is ground. The transistor 213 is a 2N5555 which is an N-channel junction field effect transistor. The output of the amplifier 215 is connected to its input negative terminal and provides the negative peak acceleration signal which is coupled through a resistor 230 to the negative terminal of a comparator operational amplifier 220.

The negative velocity signal is coupled through a resistor 221 in series with a resistor 222 to a source of positive voltage, for example +15 volts. The junction between resistors 221 and 222 is also connected in series with a resistor 223 which is connected to the negative terminal of the amplifier 206. The positive terminal is connected to ground. The output of the amplifier 206 is connected to the anode of a diode 224 having a cathode connected through a resistor 225 to ground and through a capacitor 226 to the anode of a diode 227 having a cathode connected to the output of the amplifier 206. The junction between the capacitor 226 and the anode of the diode 227 is connected to the negative input terminal of the amplifier 206. The amplifier circuit 206 produces an output displacement remaining signal which is coupled to the remaining displacement energy computer 228, shown in FIG. 12. The other inputs of computer 228 are the outputs of pressure transducers 45 and 46 of FIG. 4. The displacement energy signal DE is coupled through a resistor 229 to the negative input terminal of amplifier 220 which is connected through a resistor 230 to the output of the amplifier 215. The output of the amplifier 220 is connected to the cathode of a diode 231 and the anode of a diode 232. The two diodes are connected in inverse parallel with the anode of one connected to the cathode of the other. The positive terminal of the amplifier 220 is connected through a resistor 233 to ground through a resistor 234 to the output of the amplifier. One junction of the diodes 231 and 232 is connected to the negative terminal of the amplifier 220. The output of the amplifier 220 is the trigger signal shown in FIG. 6.

The output of the amplifier 208 is the enabling signal shown in FIG. 6, and the control to the solenoid valve comes from the pulse timer 159 which is controlled by a NAND gate circuit. Thus, a source of positive voltage, for example +15 volts, is coupled through a resistor 235 to the negative terminal of the amplifier 208. A pair of diodes 236 and 237 are coupled in inverse parallel between the output of the amplifier 208 and its negative input terminal. The plus velocity signal is coupled through a resistor 238 to the negative terminal of the amplifier 208. The positive input terminal of the amplifier is coupled through a resistor 239 to ground and through a resistor 240 to the output of the amplifier. As mentioned above, the output of the amplifier is the enabling signal shown in FIG. 6 and is coupled through a diode 241 to the base of an NPN transistor 242. The output of the amplifier is connected to the cathode of the diode 241, and the anode of diode 241 is connected to the base of transistor 242. The emitter of the transistor is grounded, and the collector is connected through a resistor 243 to a positive supply, for example +15 volts. The trigger signal from the output of amplifier 220 is coupled to the cathode of a diode 244 having an anode connected directly to the base of the transistor 242. A resistor 245 is connected between the base and the positive power supply. The collector is coupled through a capacitor 246 to the input trigger terminal, pin 2, of pulse timer 159, as shown in FIG. 5. The capacitor 246 is also connected to a junction between the anode of a diode 247 and a resistor 248 connected in parallel with the diode to the source of positive voltage. The pulse timer 159 shown is manufactured by Signetics, is designated as a 555 timer, and the terminals are marked as they appear on the 8-pin Dual Inline Package. Terminal 1 is grounded, terminal 3 is the output which is connected to the cathode of a diode 249 having a grounded anode and to terminal C leading to the solenoid valve. Terminal D leads to the solenoid valve and is grounded. Terminal 4 of the pulse timer 159 is the reset terminal and is coupled to a source of positive voltage, for example +15 volts. The output pulse from terminal 3 of the timer 159 is coupled to terminal C of the magnetic valve leads and is shown in the timing diagram of FIG. 6. Terminal 8 of the timer 159 is connected to a source of positive voltage, for example +15 volts, while a discharge terminal 7 is connected through a resistor 250 to the positive source of power and is also connected directly to a threshold terminal 6 and through a capacitor 251 to ground. There is no connection to terminal 5.

A schematic circuit diagram of the displacement energy computer circuit 228 is shown in FIG. 12. The term "displacement energy" or DE refers to the remaining energy or available energy in one chamber of the cylinder 53 in a given stroke. The circuit 228 computes the available displacement energy in accordance with the equation (2) above wherein K represents the energy required for adiabatic compression and displacement of gas from the low pressure reservoir to the high pressure reservoir(, including losses in the system and cylinder). Based on the heat capacity ratio above, the approximate value for propane is 8/7. The circuit utilizes the fact that voltage across a semiconductor junction varies as the logarithm of current at a constant temperature. The transistors and diodes connected by dashed lines are matched and thermally connected pairs. Two arrays may be used for example RCA Model CA3046 for transistors and RCA Model CA3039 for diodes. The operational amplifiers suggested are TL 084 field effect transistor input amplifiers.

The product of factors is equivalent to the sum of the longarithms of those factors, and the circuit solves the equation by implementing those principles. In a similar manner, the exponents are obtained by multiples of the logarithms.

The displacement signal is coupled through a resistor 256 to the collector of an NPN transistor 257, the emitter of which is coupled to the output of an operational amplifier 258. A capacitor 259 is connected across the emitter and collector of the transistor 257, and the collector of the transistor is also connected to the negative input terminal of the amplifier 258, the positive terminal being grounded. The emitter of the transistor 257 is connected to the emitter of an NPN transistor 260 which is matched to transistor 257. The collector is connected to the negative input terminal of an operational amplifier 261, the positive terminal of which is grounded. The output of the amplifier 261 is coupled through a resistor 262 to its negative input terminal. The output of the amplifier 261 is the displacement energy signal. The circuit within the dashed line 263 is a differential antilog converter and multiplier which is repeated for each valve control circuit. Two such circuits are required, one for each valve control circuit. The remainder of the computer circuit is used for both valves.

The low pressure signal is coupled through a resistor 264 to the negative input terminal of an operational amplifier 265 having a grounded positive terminal. The negative terminal is also coupled to the collector of a transistor 266 having an emitter coupled directly to the base of the transistor 257. A capacitor 267 is connected between the emitter and collector of the transistor 266, and the base of the transistor is grounded. The emitter of the transistor 266 is connected to the anode of a diode 268, and the cathode of the diode 268 is connected to the output of the amplifier 265 which is also coupled to a test point terminal indicated as TP. A trimming potentiometer 269 has a fixed portion connected at one end to a positive voltage source, for example +15 volts, and at the other end to a negative voltage, for example −15 volts. The tap on the potentiometer is connected through a resistor 270 to the base of an NPN transistor 271 and through a resistor 272 to ground. The collector of the transistor 271 is connected to the negative input terminal of the amplifier 265 and to the collector of the transistor 266. The low pressure signal is also coupled through a resistor 273, equal in value to the resistor 264, to the negative input terminal of an operational amplifier 274. The collector of an NPN transistor 275 is connected to the negative input terminal of the amplifier 274. The emitter is connected to a series of six diodes indicated at 276, the emitter being connected to the anode of the first diode with each cathode connected to an anode. A capacitor 277 is connected between the emitter and collector of the transistor 275. The emitter of the transistor 271 is connected to the collector and base of a transistor 278, which is matched with the transistor 275. The emitter is connected to a series of six diodes 279 which are pairwise matched with the diodes 276 and connected in series with each other in the same manner as the diodes 276 with the cathodes of the last two diodes connected together and to the output of the amplifier 274.

The high pressure signal is coupled through a resistor 280 to the negative input terminal of an operational amplifier 281, the positive input terminal of which is grounded. The negative input terminal of the amplifier 281 is also connected to the collector of an NPN transistor 282 which is matched with the transistor 271 and has a grounded base and an emitter connected to the base of the transistor 275 and the positive input terminal of the amplifier 274. A capacitor 283 is coupled between the emitter and collector of the transistor 282, and the emitter is also coupled through the anode of a diode 284 to the output of the amplifier 281. The output of the amplifier and the cathode of the diode 284 are connected together and with a resistor 285 whose opposite end is connected to the negative input terminal of the amplifier 274 and to the collector of the transistor 275. The remainder of the circuit generates a temperature sensitive reference voltage which contributes to the computation for the factor K in the equation for displacement energy, DE. A source of positive voltage, for example +15 volts, is coupled through a resistor 286 to the negative input terminal of an operational amplifier 287 having a grounded positive input terminal, the negative terminal also being connected to the collector of an NPN transistor 288 which is matched with the transistor 266. The base of the transistor 288 is grounded, a capacitor 289 is connected between the emitter and collector of the transistor 288, and the emitter is connected to the output of the amplifier 287 and the base of the transistor 260.

The electronic circuits just described are powered by rechargeable batteries (not shown) kept charged by photovoltaic array 40 of FIG. 2. Power supply connections must be made to the operational amplifiers and are not shown in the schematics.

The energy conversion system according to the present invention, as described above, thus, can permit a wind turbine to drive a reciprocating piston compressor efficiently with the compressor pumping refrigerant gases. The gas lines can be long, so that heat sources and sinks can be remote from the wind turbine and compressor. Power transmission is effectively the fluid power represented by refrigerant flow in the pipes. The insulated pipelines may also be regarded as heat pipes in an actively-driven heat pump system. Pipe runs are limited by flow losses and heat transfer through the pipe insulation. Maximum runs are on the order of a few hundred yards for small systems (twenty-foot diameter wind turbines) and increase with system scale.

Except for the long-distance pipelines and separation of system components, the basic refrigerant circuit configuration is conventional and used in many commercial applications. High-pressure gas travels from the compressor to the condenser, where it gives up heat on condensing. In this system, warm water enters and becomes the heat carrier as it becomes exiting hot water. Refrigerant condensate flows through an uninsulated pipeline to the evaporator. A float valve meters high-pressure refrigerant liquid into the low pressure side. The evaporator is a refrigerant boiler. Water is again the heat transfer medium, as warm water enters and is chilled to exit as cold water. In a heating system, the "warm" water may be cool ground water serving as a heat source. Refrigerant evaporates, absorbing heat from the water, and the low pressure refrigerant gas returns to the compressor to become high pressure gas once again.

As previously described and shown in FIG. 2, the wind turbine blades drive a crank linked to a shaft going to a spherical bearing. A linear ball bushing constrains the shaft below to a linear reciprocating motion. Shaft velocity is sensed by a velocity transducer which sends a signal to the electronic control circuit. The compressor cylinder draws gas from the two valve assemblies from the low pressure reservoir and sends that gas to the high pressure reservoir. The reservoirs absorb pulsations in the gas motion from the compressor reducing conversion of gas motion to acoustic waves traveling along the pipelines.

The high pressure reservoir serves an important heating function. In dead calm periods when ambient tremperature is very low, refrigerants could potentially condense in the compressor, diluting and washing away lubricants. To prevent this, first the compressor is normally returned to the low pressure line. Thus, condensation in the compressor can only begin in the vicinity of the pressure-determining temperature of the evaporator. The high pressure reservoir is held at the condenser temperature by heat-pipe action, with refrigerant gas condensing in the reservoir, liberating heat, and flowing back as condensate. The heated reservoir shares the insulating jacket with the compressor cylinder keeping that cylinder warm. As long as heat storage maintains condenser temperature somewhat above evaporator temperature (cold storage in ice or frozen solutions would accomplish the same purpose), condensation in the cylinder is avoided.

The electronic control circuit triggers the two magnetic valves. Electric power for the control comes from a photovoltaic array (PVA) and is stored in rechargeable batteries in the control box. The photovoltaic array serves as an "optical isolator" for the electronics permitting a complete package with no insulated wires penetrating the conductive Faraday cage formed by the housing and a screen over the photovoltaic array. This design avoids ground paths that would attract energy from lightning discharges through electronics. It would be permissible to use part of the wind-derived mechanical energy of the system to generate electricity, though for the very small scale needed, the photovoltaic approach is simpler than designing a low-power generator and linkages.

As previously described and shown in FIG. 3, the piston sends gas back and forth through the normally open low pressure inlet valves, which double as bypass valves. A pulse of current to the coil around the magnetic core extending down in front and behind the plane of the drawing causes the piece of magnetic material in the end of the inlet reed valve member to move to the O-ring valve seat adjacent the low pressure outlet of the valves. The valve body or housing is cut from three pieces of non-magnetic material. The pieces are machined, coated with gasketing compound, and screwed together (screws not shown). When the inlet valve is closed magnetically, pressure buildup quickly secures the valve in closed position so that the magnetic pulse can be very brief. When cylinder pressure builds up and exceeds output reservoir pressure, the outlet reed valve 128, now no longer partially covered by the inlet reed valve 127, opens to permit one-way exhaust flow. When compression is complete, falling cylinder pressure permits the inlet reed valve to reopen. Electrical energy to operate the servo-valve is very low since most of the energy comes from the gas flow.

The velocity transducer is formed of a stationary coil and a moving magnetic core that includes part of the reciprocating piston shaft. The voltage signal varies accurately in proportion to velocity. The transducer is commonly called a voice coil generator and is the counterpart of the voice coil actuator used in loudspeakers except that the magnet moved instead of the coil.

With respect to the electronic control circuit of FIG. 4, the lower part of the circuit is repeated for the second valve, except that the velocity signals +vel. and −vel. are interchanged. The output of the velocity transducer is supplied to an amplifier, and the amplified velocity signal is +vel. and is inverted to give −vel. The −vel. signal undergoes band limited differentiation (the circuit integrates at high frequencies) to yield an acceleration signal. A non-inverting comparator driven by the −vel. signal provides a timing waveform whose positive transition causes a quick sampling of the negative-going peak of acceleration to obtain acceleration at the beginning of the compression stroke. This acceleration is proportional to the square of angular velocity of the turbine and determines the desired energy threshold for valve closure on the compression stroke to follow immediately. The −vel. signal is integrated to give a positive position, or displacement, signal, and the displacement signal is reset to just above zero at the end of each compression stroke so that the voltage represents displacement remaining to the end of the compression stroke (including "dead volume" that is not displaced). A non-linear function generator accepts the pressure transducer output voltages and yields a voltage proportional to compression energy per unit volume. This measure has the physical units of pressure. The energy density is multiplied by displacement volume to yield a "Displacement Energy", or "DE" signal. When the positive "Displacement Energy" signal crosses the magnitude of the negative acceleration magnitude signal, the inlet valve is usually tripped shut. The valve is not tripped at very low turbine speed. A second comparator generates a trigger-enable time window beginning shortly after the beginning of the compression stroke and ending shortly before the end of the stroke. This window begins and ends as compression velocity exceeds and then falls below a fixed bias. If angular velocity is too low, the enable window has ended (or never begun) before the "Displacement Energy" threshold transition takes place, and then triggering is prevented. At very high turbine speeds, the acceleration magnitude signal will always exceed the "Displacement Energy" threshold voltage such that maximum displacement is not enough to satisfy the optimum loading criterion. In this case, the beginning of the trigger-enable window, just after the beginning of the compression stroke, times the triggering of the timer and subsequent closure of the inlet valve. Triggering is always delayed slightly until there is some velocity in the inlet valve to seat the inlet valve quickly, minimizing the energy needed to sustain a magnetic trigger pulse.

The non-linear energy function generator depends on the heat capacity ratio of the refrigerant gas ($\gamma$). The circuit of FIG. 12 is specifically devised for propane, a refrigerant gas whose heat capacity ratio ($\gamma$) is roughly 8/7. The circuit utilizes the fact that a semiconductor junction exhibits a logarithmic voltage/current characteristic that can be used to generate power functions and products. The equation solved by the circuit appears beneath the schematic. Note that a voltage representing one-times-the-logarithm of a current is generated by a single transistor, and seven-times-the-logarithm of a current is generated by seven transistors, six of them diode-connected, in series. The resulting sum of eight logarithms is applied as a voltage to the string of eight transistors, which generate current equal to the exponential function of one-eighth the input sum. This current is the desired power function product, and the linear term is subtracted at the output summing amplifier. Finally, the circuit generates the logarithm of the energy density current, sums this with the logarithm of displacement, subtracts a scaling logarithm, and exponentiates to generate the final output. The detailed circuit function will be clear to one skilled in the art of electronics.

To indicate a few more concrete details of a particular energy conversion system of the present invention, the specific energy conversion system described pumps heat from ground water at about 50° F. to aquaculture water varying from 60° to 90° F. Condenser refrigerant temperature must be limited to 105° F. to avoid exceeding the compressor cylinder's maximum pressure rating of 200 PSI. Excessive pressure in the high pressure reservoir may be used to inhibit valve triggering (not shown in circuitry), isolating the compressor cylinder from high pressure and preventing further heat pumping. The compressor cylinder is a modified air cylinder of eight-inch diameter and four-inch stroke. This displacement absorbs full output power at optimum match from a 20-foot diameter turbine up to a windspeed varying from roughly 20 to 24 MPH, depending on system operating temperatures. Pipe surface area in both the evaporator and condenser is about 40 square feet. This is sufficient to transfer roughly 100,000 BTU/HR, the maximum system output, with a temperature differential of 20° F. in both evaporator and condenser.

Inasmuch as the present invention is subject to many variations, modifications and changes in detail, it is intended that all subject matter described above and shown in the accompanying drawings be interpreted as illustrative and not in a limiting sense.

I claim:

1. A fluid energy conversion system, comprising:
   (A) variable fluid energy source means;
   (B) variable load means;
   (C) transformer means responsive to said energy source and load means, including means for determining the relative energies associated with said load and source means for controlling the period during which said load and source means are coupled together, substantially continuously to match the impedances of said source and load means, such that substantially maximum energy transfer takes place substantially continuously,
   said transformer means including fluid relief means for controlling said period and electronic control means,
   said electronic control means having, means for sensing a selected parameter of said system, means responsive to said sensed parameter for actuating said fluid relief means, and computer means responsive to said sensed parameter for computing said period during which said source and load means are coupled for transferring power from said source to said load means,
   said computer means including
      means for computing the amount of energy that can be transferred during the remainder of a transformer cycle;
      means for predicting a desired level of energy available from said source means; and
      means for initiating said period only if said energy level available from said source means exceeds said amount.

2. The system of claim 1, wherein:
   said transformer means includes piston-actuated compressor means.

3. The system of claim 1, wherein:
   said transformer means include electrically actuated relief valve means.

4. The system of claim 1, wherein:
   said fluid relief means include electrically actuated valve means for enabling energy transfer to said load means, and transfer valve means responsive to said enabling valve means for transferring energy from said source to said load means.

5. A fluid energy conversion system, comprising:
   (A) variable fluid energy source means;
   (B) variable load means;
   (C) transformer means responsive to said energy source and load means, including means for determining the relative energies associated with said load and source means for controlling the period during which said load and source means are coupled together, substantially continuously to match the impedances of said source and load means, such that substantially maximum energy transfer takes place substantially continuously,
   said transformer means including fluid relief means for controlling said period and electronic control means,
   said electronic control means having, means for sensing a selected parameter of said system, means responsive to said sensed parameter for actuating said fluid relief means, and computer means responsive to said sensed parameter for computing said period during which said source and load means are coupled for transferring power from said source to said load means,
   said computer means including
      means for computing the amount of energy transferred from said source to said load means;
      means for predicting a desired level of energy transfer; and
      means for terminating said period only if said energy transferred exceeds said level.

6. The system of claim 5, wherein:
   said transformer means include piston-actuated compressor means.

7. The system of claim 5, wherein:
   said transformer means include electrically actuated relief valve means.

8. The system of claim 5, wherein:
   said fluid relief means include
      electrically actuated valve means for enabling energy transfer to said load means, and
      transfer valve means responsive to said enabling valve means for transferring energy from said source to said load means.

9. A fluid energy conversion system, comprising:
   (A) rotating energy source means driven by variable fluid motion;
   (B) variable fluid load means;
   (C) variable energy transformer means coupled between said source and load means;
   (D) as a part of said transformer means, compressor means for conversion of rotational energy of said source means into fluid energy of said load means, where said conversion of energy takes place during repetitive energy transfer cycles, which may overlap in time, and where the repetition frequency of said transfer cycles is in fixed proportion to the rotation speed of said source means;
   (E) as a part of said compressor means, variable fluid relief means that can reduce the time duration of said transfer cycles, such that the amount of energy transferred from said source means in one of said transfer cycles can be reduced, such that the rotation speed of said source means is allowed to be higher than it would be in the absence of fluid relief;

(F) as a part of said transformer means, control means that regulate said relief means to achieve a desired range of rotation speeds in said source means, such that said source means can efficiently absorb and transfer the energy of said fluid motion;

(G) as a part of said control means, sensor means responsive to one or more selected parameters of the operation of said system, such that the response of said sensor means can potentially be used to compute approximately a specified ratio of the square of the rotation speed of said source means to a specified average energy transfer from said source means per transfer cycle; and (H) as a part of said control means, computer means that use the response of said sensor means, and that direct the regulation of said relief means, to affect said time duration, thereby to affect said amount of energy transferred and said range of rotation speeds in said source means in such a way that said specified ratio of squared rotation speed to average energy transfer per cycle is caused to be corrected toward a desired value, said desired value being determined as a value that causes substantially maximum average power transfer from said source means to said load means to take place for a range of conditions of said fluid motion and said load means.

10. The system of claim 9, wherein said specified average energy transfer is an average over one or more of said transfer cycles in the past.

11. The system of claim 9, wherein said specified average energy transfer represents the energy transferred during the present, uncompleted transfer cycle.

12. The system of claim 9, wherein said specified average energy transfer represents a predicted average over one or more of said transfer cycles in the future.

13. The system of claim 9, wherein said specified average energy transfer represents a specified combination
of an average over one or more of said transfer cycles in the past,
of the energy transferred during the present uncompleted transfer cycle, and
of a predicted average over one or more of said transfer cycles in the future.

14. The system of claim 9, wherein:
(A) said rotating energy source means is a water turbine;
(B) said fluid motion driving said source is water flowing through an adjustable gate;
(C) said desired value of said specified ratio is fixed for any given gate setting but is different for different gate settings; and
(D) said control means include means for adjusting the operation of said control means such that said desired value, toward which said specified ratio is caused to be corrected, can effectively be altered when said gate is adjusted, such that substantially maximum average power transfer can take place for any given gate setting over a range of gate settings and for said range of conditions of said fluid motion and said load means, but where said range of conditions may differ for different gate settings.

15. The system of claim 9, wherein:
(A) said rotating energy source means is a wind turbine;
(B) said desired value of said specified ratio is fixed for any given air density but is different for different values of air density; and
(C) said control means include means for adjusting the operation of said control means such that said desired value, toward which said specified ratio is caused to be corrected, can effectively be altered to fit different air density conditions, such that substantially maximum average power transfer can take place for any given air density condition over a range of said air density conditions and for said range of conditions of said fluid motion and said load means, but where said range of conditions may differ for different air density conditions.

* * * * *